United States Patent
Hwang et al.

(10) Patent No.: US 11,483,081 B2
(45) Date of Patent: Oct. 25, 2022

(54) METHOD FOR MEASURING RSRQ USING REFERENCE SIGNAL IN BWP AND TERMINAL PERFORMING SAME

(71) Applicant: LG Electronics Inc., Seoul (KR)

(72) Inventors: Jinyup Hwang, Seoul (KR); Yoonoh Yang, Seoul (KR); Sangwook Lee, Seoul (KR); Suhwan Lim, Seoul (KR); Manyoung Jung, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 16/627,995

(22) PCT Filed: Aug. 6, 2018

(86) PCT No.: PCT/KR2018/008904
§ 371 (c)(1),
(2) Date: Dec. 31, 2019

(87) PCT Pub. No.: WO2019/031791
PCT Pub. Date: Feb. 14, 2019

(65) Prior Publication Data
US 2020/0169340 A1    May 28, 2020

Related U.S. Application Data

(60) Provisional application No. 62/586,902, filed on Nov. 16, 2017, provisional application No. 62/543,933, filed on Aug. 10, 2017.

(51) Int. Cl.
*H04B 17/327* (2015.01)
*H04W 24/10* (2009.01)
(52) U.S. Cl.
CPC .......... *H04B 17/327* (2015.01); *H04W 24/10* (2013.01)

(58) Field of Classification Search
CPC ............................ H04B 17/327; H04W 24/10
See application file for complete search history.

(56) References Cited

U.S. PATENT DOCUMENTS 8,750,808 B2    6/2014    Kazmi et al.

FOREIGN PATENT DOCUMENTS

| CN | 106465173 | 2/2017 |
|---|---|---|
| CN | 106716887 | 5/2017 |

(Continued)

OTHER PUBLICATIONS

CATT, "Discussion on definition of RSRQ measurement," R4-1709422, 3GPP TSG-RAN WG4 Meeting NR AH#3, Nagoya, Japan, Sep. 18-21, 2017, 2 pages.

(Continued)

*Primary Examiner* — Natasha W Cosme
(74) *Attorney, Agent, or Firm* — Fish & Richardson P.C.

(57) ABSTRACT

One disclosure of the present specification provides a measurement method. The measurement method comprises the steps of: performing a reference signal received power (RSRP) measurement on the basis of a synchronization signal block (SSB), which is received from a serving cell; performing a received signal strength indicator (RSSI) measurement by using a reference signal, which is received in a bandwidth part (BWP), when a frequency band of the SSB is not included in the BWP, which is set for a terminal; and determining reference symbol received quality (RSRQ) on the basis of the results of the performed RSRP measurement and the performed RSSI measurement.

12 Claims, 17 Drawing Sheets

(56) References Cited

FOREIGN PATENT DOCUMENTS

| JP | 2012529782 | 11/2012 | |
| KR | 101450266 | 10/2014 | |
| KR | 101537644 | 7/2015 | |
| KR | 20160129902 | 11/2016 | |
| KR | 101685905 | 12/2016 | |
| WO | WO2010142527 | 12/2010 | |
| WO | WO-2010142527 A1 * | 12/2010 | ........... H04B 17/318 |
| WO | WO2016010685 | 1/2016 | |
| WO | WO 2017047988 | 3/2017 | |

OTHER PUBLICATIONS

Ericsson, "DRAFT Summary of [NR-AH2#13][NR/RRM] TP on RRM," R2-170xxxx, 3GPP TSG-RAN WG2 #NR Ad Hoc, Berlin, Germany, Aug. 21-25, 2017, 25 pages.

Extended European Search Report in EP Appln. No. 18845116.5, dated Feb. 16, 2021, 15 pages.

Intel Corporation, "On QCL for different BW parts and other QCL details," R1-1710539, 3GPP TSG RAN WG1 NR Ad-Hoc#2, Qingdao, P.R. China, Jun. 27-30, 2017, 5 pages.

Japanese Office Action in JP Appln. No. 2019-572487, dated Feb. 16, 2021, 10 pages (with English translation).

Korean Office Action in KR Appln. No. 10-2019-7036556, dated Dec. 24, 2020, 11 pages (with English translation).

LG Electronics, "Details of congestion level measurement," Rl-166828, 3GPP TSG RAN WG1 Meeting #86, Gothenburg, Sweden, Aug. 22-26, 2016, 3 pages.

LG Electronics, "Discussion on RRM measurement in NR," R1-1704870, 3GPP TSG RAN WG1 Meeting #88bis, Spokane, USA, Apr. 3-7, 2017, 4 pages.

MediaTek Inc., "NR Quality based measurement," R4-1709338, 3GPP TSG-RAN WG4 NR AH Meeting #3, Nagoya, Japan, Sep. 18-21, 2017, 4 pages.

MediaTek Inc., "Quality based measurement on SS block," R4-1707876, 3GPP TSG-RAN WG4 Meeting #84, Berlin, Germany, Aug. 21-25, 2017, 4 pages.

MediaTek Inc., "Remaining details on SS block indication for rate matching and transmissions within wideband CC," R1-1716203, 3GPP TSG RAN WG1 Meeting NR#3, Nagoya, Japan, Sep. 18-21, 2017, 4 pages.

Samsung, "Further Discussion on NR Quality based Measurement Metrics," R4-1709342, 3GPP TSG-RAN WG4 Meeting NR#3, Nagoya, Japan, Sep. 18-21, 2017, 6 pages.

3rd Generation Partnership Project; Technical Specification Group Radio Access Network; Evolved Universal Terrestrial Radio Access (E-UTRA), "Physical Channels and Modulation (Release 10)," 3GPP TS 36.211 V10.4.0, dated Dec. 2011, 101 pages.

Office Action in Chinese Application No. 201880044327.5, dated Aug. 17, 2022, 14 pages (with English translation).

Sony, "Discussion on small cell discovery signal design," 3GPP TSG RAN WG1 Meeting #76bis, R1-141570, Shenzhen, China, Mar. 31-Apr. 4, 2014, 4 pages.

* cited by examiner

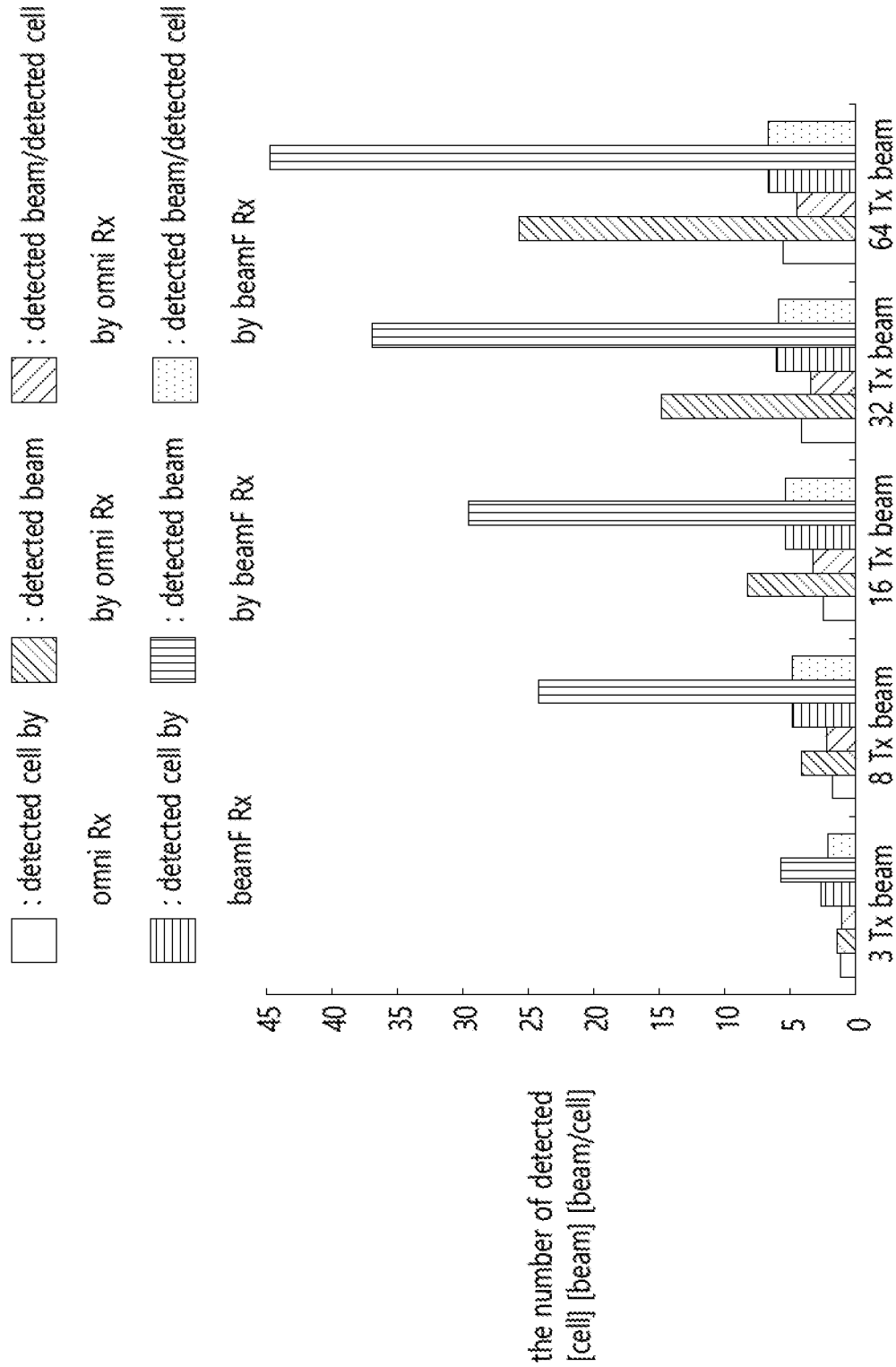

METHOD FOR MEASURING RSRQ USING REFERENCE SIGNAL IN BWP AND TERMINAL PERFORMING SAME

CROSS-REFERENCE TO RELATED APPLICATIONS

This application is a National Stage application under 35 U.S.C. § 371 of International Application No. PCT/KR2018/008904, filed on Aug. 6, 2018, of U.S. Provisional Applications No. 62/543,933 filed on Aug. 10, 2017 and No. 62/586,902 filed on Nov. 16, 2017. The disclosures of the prior applications are incorporated by reference in their entirety.

BACKGROUND OF THE SPECIFICATION

Field of the Specification

The present specification relates to next generation mobile communication.

Discussion of the Related Art

With the success of long-term evolution (LTE)/LTE-A (LTE-Advanced) for the 4th generation mobile communication, more interest is rising to the next generation, i.e., 5th generation (also known as 5G) mobile communication and extensive research and development are being carried out accordingly.

The 5G mobile communication defined in the international telecommunication union (ITU) provides a data transfer rate of up to 20 Gbps and a sensible transfer rate of at least 100 Mbps anytime anywhere. 'IMT-2020' is a formal name, and aims to be commercialized in the year 2020 worldwide.

The ITU presents three usage scenarios, such as enhanced Mobile BroadBand (eMBB) massive Machine Type Communication (MMTC) and Ultra Reliable and Low Latency Communications (URLLC).

First, the URLLC relates to a usage scenario which requires a high reliability and a low latency. For example, a service such as autonomous driving, factory automation, and augmented reality requires a high reliability and a low latency (e.g., a latency less than or equal to 1 ms). At present, a latency of 4G (LTE) is statistically 21-43 ms (best 10%), 33-75 ms (median). This is insufficient to support a service requiring the latency less than or equal to 1 ms. Therefore, in order to support the URLLC usage scenario, a packet error rate (PER) below 10-5 and a latency of 1 ms are required. Herein, the latency is defined as a latency between a MAC layer of a UE and a MAC layer of a network. At present, in the 3GPP standard group, a standardization is carried out in two ways, i.e., a way of decreasing a latency and a way of increasing reliability in order to support URLCC. First, as the way of decreasing the latency, a transmission time interval (TTI) is defined to be less than or equal to 1 ms to redefine a radio frame structure, to adjust an HARQ scheme at an L2 layer, and to improve an initial attach procedure and scheduling. As the way of increasing the reliability, a multiple connectivity, a frequency/space-domain multi-link diversity, a higher-layer data duplication scheme, or the like are taken into account.

Next, an eMBB usage scenario relates to a usage scenario requiring a mobile ultra-wide band.

Beamforming, massive MIMO, full dimensional MIMO (FD-MIMO), array antenna, analog beamforming, and large scale antenna techniques are discussed in a 5G mobile communication system in order to achieve a high data transfer rate. In addition, there is ongoing discussion on a non-orthogonal multiple access (NOMA) technique to enable a service of a great number of UEs. While the existing OFDMA scheme is the concept in which resources are allocated orthogonally to users by dividing time and frequency with respect to each user, the NOMA intends to increase band efficiency by allowing multiple users to be able to use the same resource.

In a next-generation mobile communication system, a serving cell may configure, for each UE, a bandwidth part (BWP) that is a frequency band to be used for uplink transmission and downlink transmission. A frequency band of a synchronization signal block (SSB) transmitted by the serving cell is configured independently of the BWP, and accordingly the frequency band of the SSB may not be included in the BWP.

The UE may continuously measure the quality of the serving cell and the quality of a neighbor cell in order to be provided with optimal mobility from a network. The UE may perform measurement based on the SSB. When the frequency band of the SSB is not included in the BWP, a measured RSRQ may not properly reflect interference and channel characteristics of the BWP in which the UE actually operates. That is, when the SSB is not included in the BWP, the accuracy of measurement of the serving cell and the neighbor cell may be low. Specifically, as inaccurate RSRQ is reported, a problem may arise in mobility of the UE, for example, an inaccurate handover operation occurs.

In the next-generation mobile communication system, a base station and a UE consider performing analog beamforming. Particularly, a receiving antenna of the UE may be configured in two types, which are an omnidirectional receiving antenna and an analog beamforming receiving antenna. The signal-power-to-interference-power ratio (SINR) of the UE in each cell may vary depending on the type of the receiving antenna, and accordingly the cell detection performance of the UE may also vary. In the next-generation mobile communication system, since the base station transmits a synchronization signal using analog beamforming, cell detection and beam detection of the UE may also vary depending on the type of the receiving antenna of the UE. However, the capability of a UE considering the type of a receiving antenna has not yet been defined, and a method for a base station to obtain information about the type of a receiving antenna of a UE also has not been proposed.

SUMMARY OF THE SPECIFICATION

Accordingly, a disclosure of the present specification has been made in an effort to solve the aforementioned problem. That is, an aspect of the present specification is to provide a method enabling a UE to accurately perform measurement in a next-generation mobile communication system. Further, an aspect of the present specification is to provide a method for defining and reporting the capability of a UE according to the type of a receiving antenna in a next-generation mobile communication system.

To achieve the foregoing aspects, one disclosure of the present specification provides a measurement method. The measurement method may include: performing reference signal received power (RSRP) measurement based on a synchronization signal block (SSB) received from a serving cell; performing received signal strength indicator (RSSI) measurement based on a reference signal received in a bandwidth part (BWP) configured for the UE, based on that a frequency band of the SSB is not included in the BWP; and determining a reference signal received quality (RSRQ) based on the performed RSRP measurement and the performed RSSI measurement.

The RSRP measurement may be performed using a secondary synchronization signal (SSS) included in the SSB.

The measurement method may further include receiving information for a band for RSSI measurement included in the BWP from the serving cell, wherein the band for RSSI measurement is a frequency band included in the BWP.

The performing of the RSSI measurement may be performing RSSI measurement based on a reference signal received in the band for RSSI measurement.

The RSSI measurement using the reference signal received in the BWP may be performed when the SSB and the reference signal in the BWP have a quasi-co-location (QCL) relationship.

The measurement method may further include receiving an indication indicating that the SSB and the reference signal in the BWP have the quasi-co-location (QCL) relationship.

The measurement method may further include performing RSSI measurement based on a reference signal received in the SSB, based on that the frequency band of the SSB is included in the BWP.

The measurement method may further include reporting the determined RSRQ to the serving cell.

The measurement method may further include reporting information for an antenna-related capability to the serving cell.

The information for the antenna-related capability includes information for whether a receiving antenna supports analog beamforming.

To achieve the foregoing aspects, one disclosure of the present specification provides a UE performing measurement. The UE may include: a transceiver; and a processor to control the transceiver, the processor is configured to: perform reference signal received power (RSRP) measurement based on a synchronization signal block (SSB), which is received from a serving cell through the transceiver; perform received signal strength indicator (RSSI) measurement based on a reference signal received in a bandwidth part (BWP) configured for the UE, based on that a frequency band of the SSB is not included in the BWP; and determine a reference signal received quality (RSRQ) based on the performed RSRP measurement and the performed RSSI measurement.

The processor may further configured to: control the transceiver to receive information for a band for RSSI measurement included in the BWP from the serving cell; and performs RSSI measurement based on a reference signal received in the band for RSSI measurement, and wherein the band for RSSI measurement is a frequency band included in the BWP.

The processor may control the transceiver to report information for an antenna-related capability to the serving cell.

The information for the antenna-related capability includes information for whether a receiving antenna supports analog beamforming.

According to a disclosure of the present specification, the above problem of the related art is solved.

BRIEF DESCRIPTION OF THE DRAWINGS

FIG. 14 shows the result of simulating the numbers of cells and beams detected by a UE according to the number of beams transmitted by a base station and the type of a receiving antenna of the UE and the ratio between the number of cells and the number of beams.

DETAILED DESCRIPTION OF THE EMBODIMENTS

Figure 1:
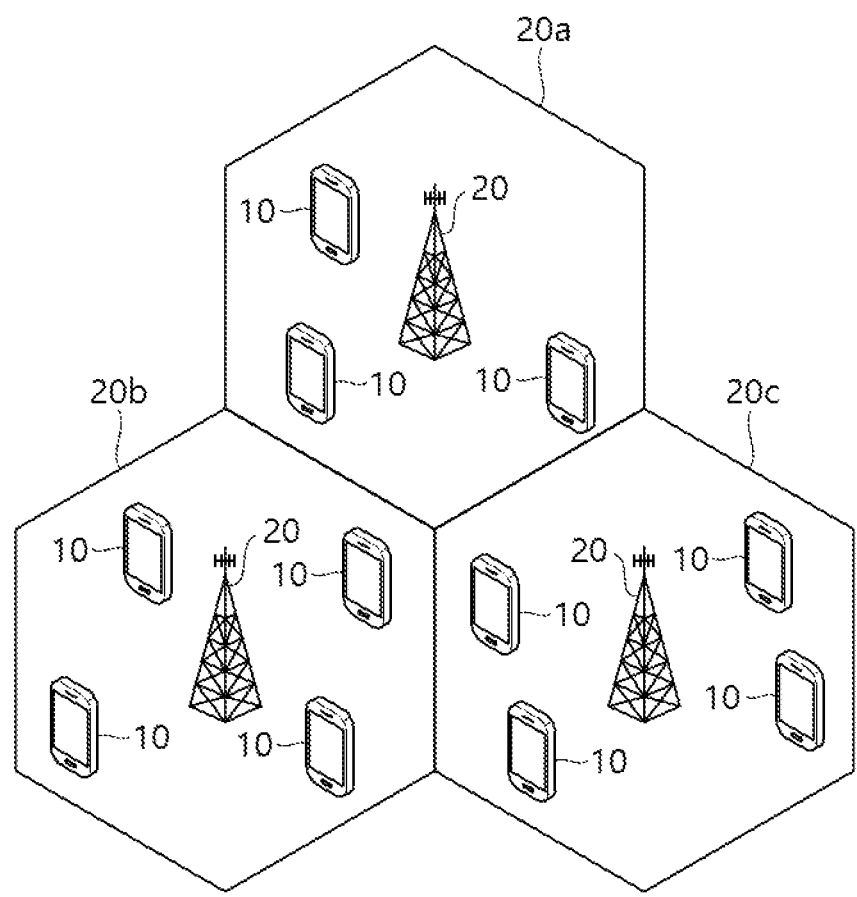
FIG. 1 is a wireless communication system.

The technical terms used herein are used to merely describe specific embodiments and should not be construed as limiting the present disclosure. Further, the technical terms used herein should be, unless defined otherwise, interpreted as having meanings generally understood by those skilled in the art but not too broadly or too narrowly. Further, the technical terms used herein, which are determined not to exactly represent the spirit of the disclosure, should be replaced by or understood by such technical terms as being able to be exactly understood by those skilled in the art. Further, the general terms used herein should be interpreted in the context as defined in the dictionary, but not in an excessively narrowed manner.

The expression of the singular number in the present disclosure includes the meaning of the plural number unless the meaning of the singular number is definitely different from that of the plural number in the context. In the following description, the term 'include' or 'have' may represent the existence of a feature, a number, a step, an operation, a component, a part or the combination thereof described in the present disclosure, and may not exclude the existence or addition of another feature, another number, another step, another operation, another component, another part or the combination thereof.

The terms 'first' and 'second' are used for the purpose of explanation about various components, and the components are not limited to the terms 'first' and 'second'. The terms 'first' and 'second' are only used to distinguish one component from another component. For example, a first component may be named as a second component without deviating from the scope of the present disclosure.

It will be understood that when an element or layer is referred to as being "connected to" or "coupled to" another element or layer, it can be directly connected or coupled to the other element or layer or intervening elements or layers may be present. In contrast, when an element is referred to as being "directly connected to" or "directly coupled to" another element or layer, there are no intervening elements or layers present.

Hereinafter, exemplary embodiments of the present disclosure will be described in greater detail with reference to the accompanying drawings. In describing the present disclosure, for ease of understanding, the same reference numerals are used to denote the same components throughout the drawings, and repetitive description on the same components will be omitted. Detailed description on well-known arts which are determined to make the gist of the disclosure unclear will be omitted. The accompanying drawings are provided to merely make the spirit of the disclosure readily understood, but not should be intended to be limiting of the disclosure. It should be understood that the spirit of the disclosure may be expanded to its modifications, replacements or equivalents in addition to what is shown in the drawings.

As used herein, 'base station' generally refers to a fixed station that communicates with a wireless device and may be denoted by other terms such as eNB (evolved-NodeB), BTS (base transceiver system), gNB (next Generation Node B) or access point.

As used herein, 'user equipment (UE)' may be stationary or mobile, and may be denoted by other terms such as device, wireless device, terminal, MS (mobile station), UT (user terminal), SS (subscriber station), MT (mobile terminal) and etc.

Definition of Terms

For a better understanding, terms used herein are briefly defined before describing the present disclosure with reference to the accompanying drawings.

UMTS: Abbreviation for Universal Mobile Telecommunication System, which refers to a third-generation mobile communication network.

UE/MS: User Equipment/Mobile Station, which refers to a terminal device

EPS: Abbreviation for Evolved Packet System, which refers to a core network supporting a Long-Term Evolution (LTE) network. An evolved version of UMTS.

PDN (Public Data Network): An independent network in which a service-providing server is located PDN connection: Connection from a UE to a PDN, that is, association (connection) between a UE represented by an IP address and a PDN represented by an access point name (APN).

PDN-GW (Packet Data Network Gateway): A network node of an EPS network that performs functions of UE IP address allocation, packet screening & filtering, and charging data collection.

Serving GW (Serving Gateway): A network node of an EPS network that performs functions of mobility anchoring, packet routing, idle-mode packet buffering, and triggering an MME to page a UE PCRF (Policy and Charging Rule Function): A node of an EPS network that performs policy decision to dynamically apply QoS and charging policies differentiated for each service flow.

APN (Access Point Name): Name of an access point managed by a network, which is provided for a UE, that is, a character string for denoting or distinguishing a PDN. A requested service or network (PDN) is accessed via a corresponding P-GW, and an APN is a name (character string, e.g., internet.mnc012.mcc345.gprs) predefined in the network to be able to discover the P-GW.

TEID (Tunnel Endpoint Identifier): An end point ID of a tunnel configured between nodes in a network, which is configured for each section per bearer of each UE.

NodeB: A base station of a UMTS network. A NodeB is installed outdoors and corresponds in cell coverage size to a macro cell.

eNodeB: A base station of an EPS and is installed outdoors. An eNodeB corresponds in cell coverage size to a macro cell.

(e)NodeB: Collectively refer to NodeB and eNodeB.

MME: Abbreviation for Mobility Management Entity and serves to control each entity in an EPS in order to provide a session and mobility for a UE.

Session: A pathway for data transmission. The unit of a session may include a PDN, a bearer, and an IP flow, which may respectively correspond to an overall target network unit (APN or PDN unit), a unit distinguished by QoS therein (bearer unit), and a destination IP address unit as defined by the 3GPP.

PDN connection: Connection from a UE to a PDN, that is, association (connection) between a UE represented by an IP address and a PDN represented by an access point name (APN). This means connection between entities (UE-PDN GW) in a core network to form a session.

UE Context: Context information about a UE used to manage the UE in a network, i.e., context information including a UE ID, mobility (e.g., current location), and attributes of a session (QoS or priority).

OMA DM (Open Mobile Alliance Device Management): A protocol designed to manage mobile devices, such as a cellular phone, a PDA, or a portable computer, which performs functions of device configuration, firmware upgrading, error report, and the like.

OAM (Operation Administration and Maintenance): A network management function group providing network failure display, performance information, and data and diagnosis functions.

NAS configuration MO (Management Object): Refers to a management object (MO) used to configure parameters associated with NAS functionality for a UE.

NAS (Non-Access-Stratum): Upper stratum of a control plane between a UE and an MME, which supports mobility management, session management, IP address management, and the like between a UE and a network.

MM (Mobility Management) operation/procedure: An operation or procedure for mobility control/management/control of a UE. The MM operation/procedure may be interpreted as including at least one of an MM operation/procedure in a CS network, a GMM operation/procedure in a GPRS network, and an EMM operation/procedure in an EPS network. The UE and a network node (MME, SGSN, and MSC) exchange MM messages in order to perform the MM operation/procedure.

SM (Session Management) operation/procedure: An operation or procedure for controlling/managing/processing/handling a user plane and/or bearer context/PDP context of a UE. The SM operation/procedure may be interpreted as including at least one of an SM operation/procedure in a GPRS network and an ESM operation/procedure in an EPS network. The UE and a network node (MME and SGSN) exchange SM messages in order to perform the SM operation/procedure.

Low-priority UE: A UE configured with low priority in NAS signaling, which is disclosed in detail in the standard document 3GPP TS 24.301 and TS 24.008.

Normal-priority UE: A normal UE not configured with low priority

Dual-priority UE: A UE configured with dual priority. That is, a UE that is configured with low priority in NAS signaling and is also configured to override the low priority in NAS signaling, which is disclosed in detail in the standard document 3GPP TS 24.301 and TS 24.008.

Public Land Mobile Network (PLMN): Abbreviation for Public Land Mobile Network, which refers to the network identification number of a mobile communication provider. In roaming of a UE, the PLMN is divided into a home PLMN (HPLMN) and a visited PLMN (VPLMN).

FIG. 1 illustrates a wireless communication system.

As seen with reference to FIG. 1, the wireless communication system includes at least one base station (BS) 20. Each base station 20 provides a communication service to specific geographical areas (generally, referred to as cells) 20a, 20b, and 20c. The cell can be further divided into a plurality of areas (sectors).

The UE generally belongs to one cell and the cell to which the UE belong is referred to as a serving cell. A base station that provides the communication service to the serving cell is referred to as a serving BS. Since the wireless communication system is a cellular system, another cell that neighbors to the serving cell is present. Another cell which neighbors to the serving cell is referred to a neighbor cell. A base station that provides the communication service to the neighbor cell is referred to as a neighbor BS. The serving cell and the neighbor cell are relatively decided based on the UE.

Hereinafter, a downlink means communication from the base station 20 to the UE 10 and an uplink means communication from the UE 10 to the base station 20. In the downlink, a transmitter may be a part of the base station 20 and a receiver may be a part of the UE 10. In the uplink, the transmitter may be a part of the UE 10 and the receiver may be a part of the base station 20.

Hereinafter, the LTE system will be described in detail.

Figure 2:
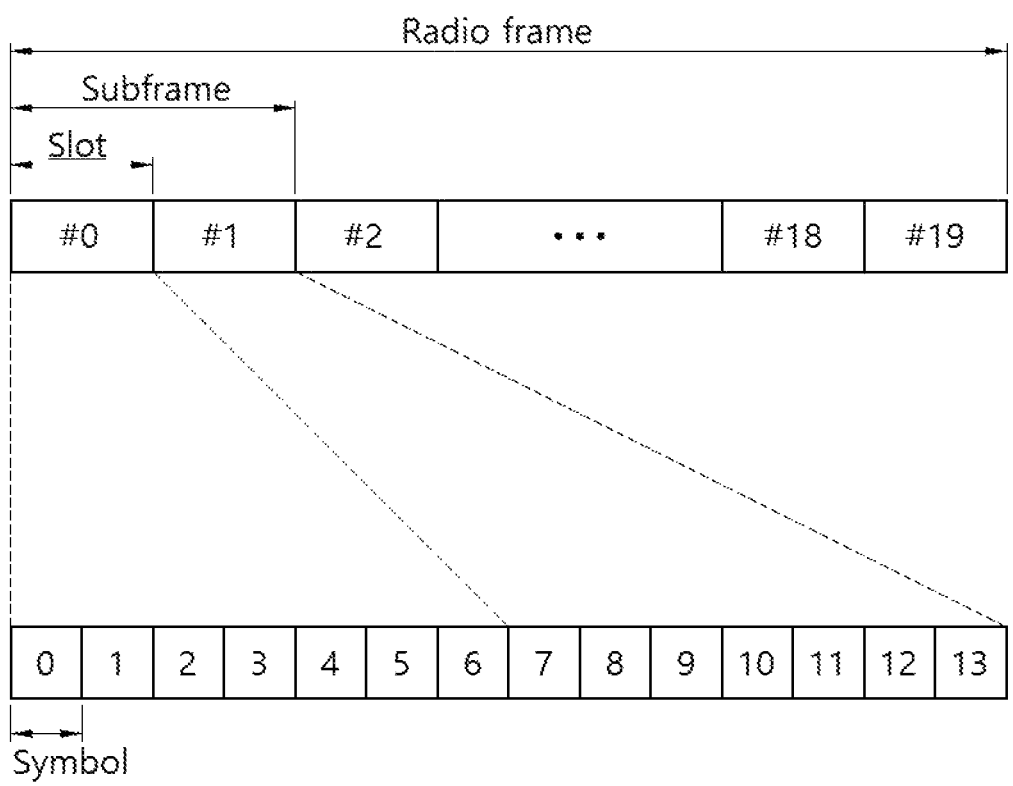
FIG. 2 illustrates a structure of a radio frame according to FDD in 3GPP LTE.

FIG. 2 shows a downlink radio frame structure according to FDD of 3rd generation partnership project (3GPP) long term evolution (LTE).

The radio frame of FIG. 2 may be found in the section 5 of 3GPP TS 36.211 V10.4.0 (2011-12) "Evolved Universal Terrestrial Radio Access (E-UTRA); Physical Channels and Modulation (Release 10)".

The radio frame includes 10 sub-frames indexed 0 to 9. One sub-frame includes two consecutive slots. Accordingly, the radio frame includes 20 slots. The time taken for one sub-frame to be transmitted is denoted TTI (transmission time interval). For example, the length of one sub-frame may be 1 ms, and the length of one slot may be 0.5 ms.

The structure of the radio frame is for exemplary purposes only, and thus the number of sub-frames included in the radio frame or the number of slots included in the sub-frame may change variously.

One slot includes NRB resource blocks (RBs) in the frequency domain. For example, in the LTE system, the number of resource blocks (RBs), i.e., NRB, may be one from 6 to 110.

The resource block is a unit of resource allocation and includes a plurality of sub-carriers in the frequency domain. For example, if one slot includes seven OFDM symbols in the time domain and the resource block includes 12 sub-carriers in the frequency domain, one resource block may include 7×12 resource elements (REs).

<Measurement and Measurement Reporting>

It is necessary for a mobile communication system to support a mobility of a user equipment (UE) 100. Therefore, the UE 100 persistently measures quality of a serving cell currently providing a service and quality of a neighbor cell. The UE 100 reports a measurement result to a network at a proper time, and the network provides an optimal mobility to the UE through a handover or the like. Measurement of this purpose is ordinarily called radio resource management (RRM).

Meanwhile, the UE 100 monitors downlink quality of a primary cell based on a CRS. This is called radio link monitoring (RLM).

Figure 3:
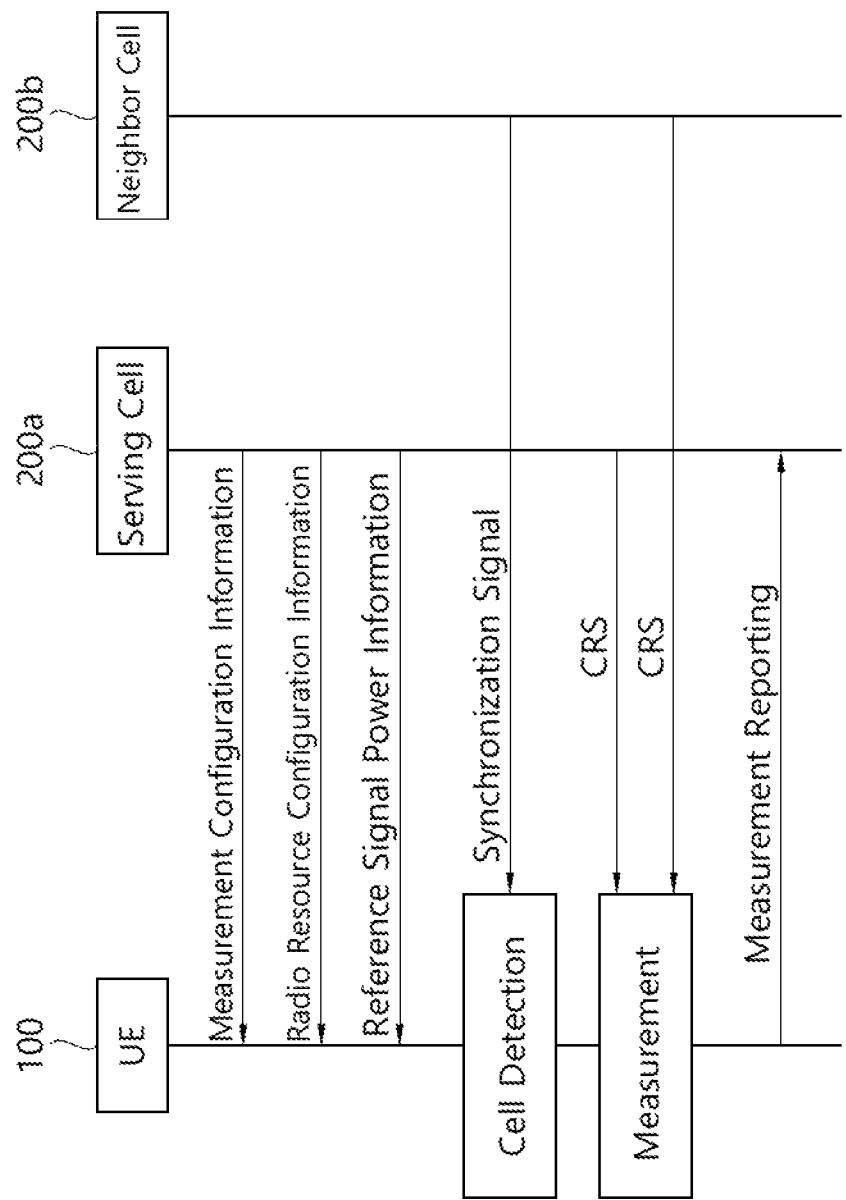
FIG. 3 shows a measurement and measurement reporting procedure.

FIG. 3 shows a measurement and measurement reporting procedure.

As can be seen with reference to FIG. 3, a UE detects a neighbor cell based on a synchronization signal (SS) transmitted from the neighbor cell. The SS may include a primary synchronization signal (PSS) and a secondary synchronization signal (SSS).

In addition, when each of a serving cell 200a and a neighbor cell 200b transmits a cell-specific reference signal (CRS) to the UE 100, the UE 100 performs measurement through the CRS and transmits a measurement result to the serving cell 200a. In this case, the UE 100 compares power of the received CRS, based on information on received reference signal power.

In this case, the UE 100 may perform measurement by using the following three methods.

1) Reference signal received power (RSRP): It indicates average received power of all REs for carrying a CRS transmitted across a whole band. In this case, average received power of all REs for carrying a channel state information (CSI)-reference signal (RS), instead of the CRS, may be measured.

2) Received signal strength indicator (RSSI): It indicates received power measured at a whole band. The RSSI includes all of a signal, an interference, and a thermal noise.

3) Reference signal received quality (RSRQ): It indicates a CQI, and may be determined as a 'RSRP/RSSI' based on a measurement bandwidth or subband. That is, the RSRQ implies a signal-to-noise interference ratio (SINR). Since the RSRP cannot provide sufficient mobility information, RSRQ may be used instead of the RSRP in a handover or cell reselection procedure.

It may be calculated that RSRQ=RSSI/RSSP.

Meanwhile, the UE 100 receives a measurement configuration information element (IE) from the serving cell 100a for the measurement. A message including the measurement configuration IE is called a measurement configuration message. Herein, the measurement configuration IE may also be received through an RRC connection reconfiguration message. If a measurement result satisfies a reporting condition in the measurement configuration information, the UE reports the measurement result to a base station. A message including the measurement result is called a measurement reporting message.

The measurement configuration IE may include measurement object information. The measurement object information is information on an object for which the UE will perform measurement. The measurement object includes at least any one of an intra-frequency measurement object which is an object of intra-cell measurement, an inter-frequency measurement object which is an object of inter-cell measurement, and an inter-RAT measurement object which is an object of inter-RAT measurement. For example, the intra-frequency measurement object may indicate a neighbor cell having the same frequency band as the serving cell. The inter-frequency measurement object may indicate a neighbor cell having a frequency band different from the serving cell. The inter-RAT measurement object may indicate a neighbor cell of an RAT different from an RAT of the serving cell.

Meanwhile, the UE 100 also receives a radio resource configuration IE as illustrated.

The radio resource configuration dedicated IE is used to configure/modify/release a radio bearer, or to modify a MAC configuration. The radio resource configuration IE includes subframe pattern information. The subframe pattern information is information on a measurement resource restriction pattern on a time domain for measurement of RSRP and RSRQ for a primary cell (PCell).

<Next-Generation Mobile Communication Network>

With the successful commercialization of mobile communication based on the 4G LTE/IMT (international mobile telecommunications) standard, research on the next-generation mobile communication (5G mobile communication) is underway. A 5G mobile communication system aims at higher capacity than the current 4G LTE, and can increase density of mobile broadband users and support device to device (D2D), high reliability, and machine type communication (MTC). The 5G research and development also aim at lower latency and lower battery consumption than a 4G mobile communication system to implement better Internet of things. A new radio access technology (new RAT or NR) may be proposed for the 5G mobile communication.

In the NR, it can be considered that a downlink (DL) subframe is used in reception from a base station and an uplink (UL) subframe is used in transmission to the base station. This approach may be applied to paired spectra and unpaired spectra. One pair of spectra implies that two carrier spectra are included for DL and UL operations. For example, in one pair of spectra, one carrier may include a DL band and a UL band which are paired with each other.

Figure 4:
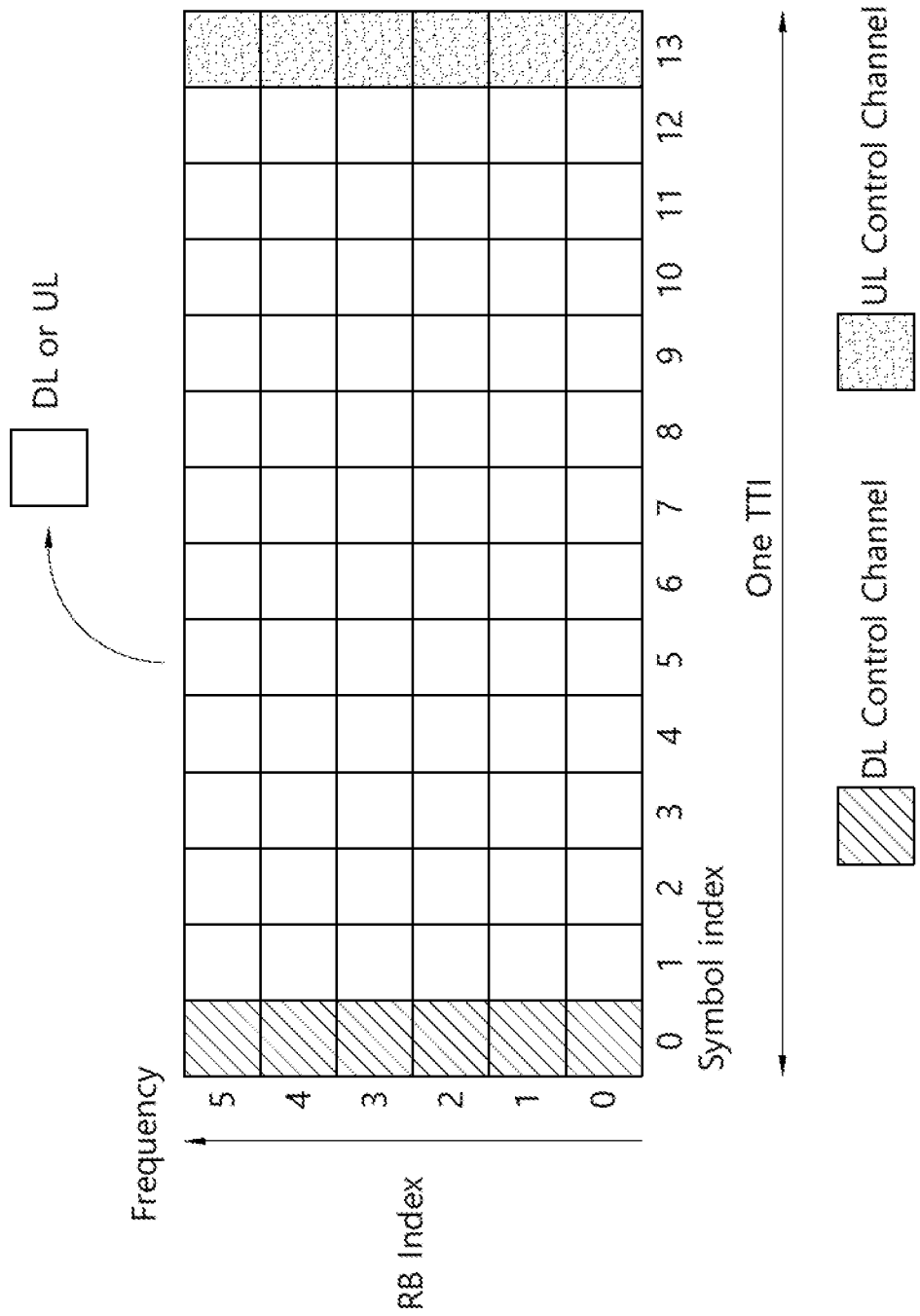
FIG. 4 shows an example of a subframe type in NR.

FIG. 4 shows an example of a subframe type in NR.

A transmission time interval (TTI) of FIG. 4 may be referred to as a subframe or slot for NR (or new RAT). A subframe (or slot) of FIG. 4 may be used in a TDD system of NR (or new RAT) to minimize data transmission latency. As shown in FIG. 4, the subframe (or slot) includes 14 symbols, similarly to the current subframe.

A front portion symbol of the subframe (or slot) may be used for a DL control channel, and an end portion symbol of the subframe (or slot) may be used for a UL control channel. The remaining symbols may be used for DL data transmission or UL data transmission. According to such a subframe (or slot) structure, DL transmission and UL transmission may be sequentially performed in one subframe (or slot). Accordingly, DL data may be received within the subframe (or slot), and a UL acknowledgement (ACK/NACK) may be transmitted within the subframe (or slot).

The subframe (or slot) structure may be referred to as a self-contained subframe (or slot). The use of the subframe (or slot) structure has an advantage in that a time required to transmit data which has been erroneously received is reduced, thereby minimizing a final data transmission latency. In the self-contained subframe (or slot) structure, a time gap may be required in a process of transitioning from a transmission mode to a reception mode or from the reception mode to the transmission mode. For this, some OFDM symbols may be set to a guard period (GP) when switching from DL to UL in the subframe structure.

Figure 5:
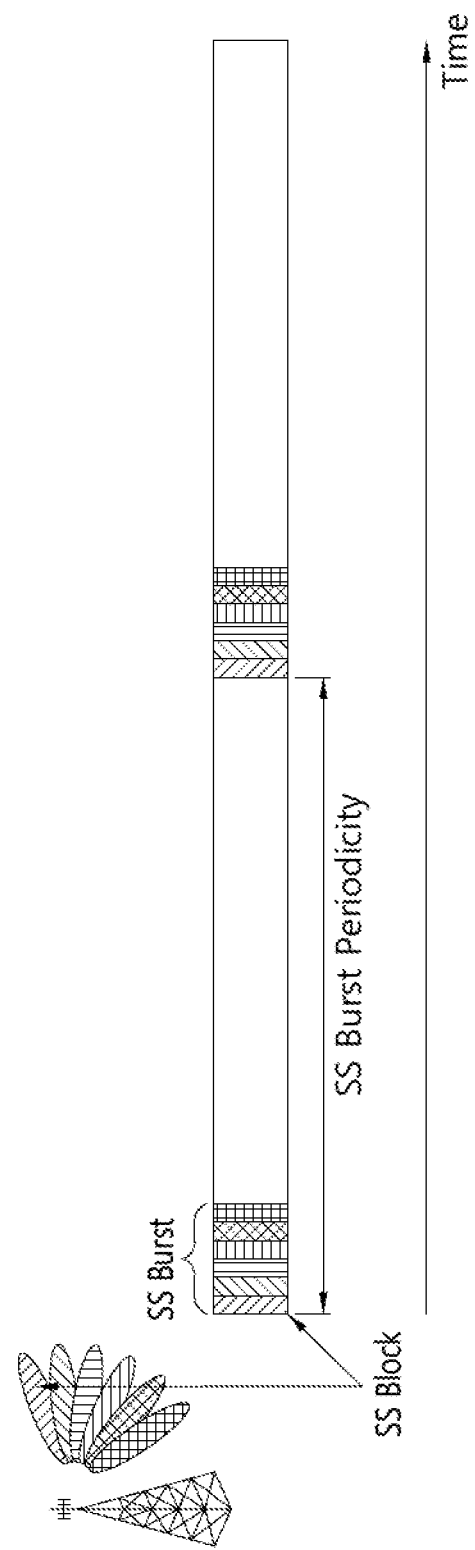
FIG. 5 shows an example of beam sweeping of a synchronization signal (SS) in NR.

FIG. 5 shows an example of beam sweeping of a synchronization signal (SS) in NR.

In an existing LTE-A system, a base station configures a measurement gap for a UE so that the UE performs measurement for a neighbor cell operating with an inter-frequency/inter-radio access technology. Accordingly, the UE performs RF retuning within the duration of the measurement gap configured by the serving base station and then performs cell detection and RSRP measurement. Since the UE can perform measurement in cells on an intra-frequency without RF retuning, a measurement gap is not configured for the intra-frequency.

However, in an NR system, even though a UE can perform measurement in cells on an intra-frequency without RF retuning, beamforming is applied to signal transmission, and thus beam sweeping in a beamforming direction is required for the measurement.

In NR, beam sweeping is performed for an SS. Referring to FIG. 5, an SS bust is transmitted according to predetermined periodicity. Here, a base station may transmit each SS block in the SS bust by performing beam sweeping according to time. Therefore, a UE receives the SS block by performing beam sweeping and performs cell detection and measurement.

In NR, an intra-frequency and an inter-frequency are defined as follows.

(1) In RRM Measurement Based on a Block for Transmitting an SS ("SSB")

1) Intra-Frequency in SSB-Based RRM Measurement

When the center frequency of an SSB of a serving cell is the same as the center frequency of an SSB of a neighbor cell, the cells may be considered as having an intra-frequency relationship.

When subcarrier spacing for an SSB of a serving cell is the same as that for an SSB of a neighbor cell, the cells may be considered as having an intra-frequency relationship.

2) Inter-frequency in SSB-based RRM measurement.

When the center frequency of an SSB of a serving cell is different from the center frequency of an SSB of a neighbor cell, the cells may be considered as having an inter-frequency relationship.

When subcarrier spacing for an SSB of a serving cell is different from that for an SSB of a neighbor cell, the cells may be considered as having an inter-frequency relationship.

(2) In RRM Measurement Based on CSI-RS

1) Intra-Frequency in RRM Measurement Based on CSI-RS

When the bandwidth of a CSI-RS resource set for measurement in a neighbor cell is included in the bandwidth of a CSI-RS resource set for measurement in a serving cell, the cells may be considered as having an intra-frequency relationship.

When subcarrier spacing for a CSI-RS of a serving cell is the same as that for a CSI-RS of a neighbor cell, the cells may be considered as having an intra-frequency relationship.

2) Inter-Frequency in RRM Measurement Based on CSI-RS

When the bandwidth of a CSI-RS resource set for measurement in a neighbor cell is not included in the bandwidth of a CSI-RS resource set for measurement in a serving cell, the cells may be considered as having an inter-frequency relationship.

When subcarrier spacing for a CSI-RS of a serving cell is different from that for a CSI-RS of a neighbor cell, the cells may be considered as having an inter-frequency relationship.

Measurement categories are divided into the following three types.

Intra-frequency measurement without requiring RF retuning

Intra-frequency measurement requiring RF retuning

Inter-frequency measurement requiring RF retuning

Cell detection and measurement for cell on intra-frequency

In NR, information necessary for a UE to perform initial access, that is, an SS (including a PSS and an SSS) and a physical broadcast channel (PBCH) including an MIB, are defined as an SS block. Further, a plurality of SS blocks may be defined as an SS bust, and a plurality of SS busts may be defined as an SS bust set. Each SS block may be assumed to be beamformed in a particular direction, and a plurality of SS blocks in an SS bust set may be designed to support UEs existing in different directions.

In NR, beam sweeping is performed for an SS. Referring to FIG. 5, an SS bust is transmitted according to predetermined periodicity. Here, a base station may transmit each SS block in the SS bust by performing beam sweeping according to time. Therefore, a UE receives the SS block by performing beam sweeping and performs cell detection and measurement.

A bandwidth and periodicity of the SS are configured from among the following candidate values.

(a) NR SS Bandwidth

For frequency range category #1 (below 6 GHz) where candidate subcarrier spacing values are one of [15 kHz, 30 kHz, 60 kHz], Candidate minimum NR carrier bandwidths are [5 MHz, 10 MHz, 20 MHz], and Candidate transmission bandwidths of each synchronization signal are [1.08 MHz, 2.16 MHz, 4.32 MHz, 8.64 MHz]

For frequency range category #2 (above 6 GHz) where [120 kHz, 240 kHz] are candidate subcarrier spacing values, Candidate minimum NR carrier bandwidths are [20 MHz, 40 MHz, 80 MHz], and Candidate transmission bandwidths of each synchronization signal are [8.64 MHz, 17.28 MHz, 34.56 MHz, 69.12 MHz].

(b) Periodicity of SS

For carrier frequency range #1 (below 6 GHz), the periodicity of the SS is [5 ms, 10 ms, 20 ms, 40 ms, 80 ms, 100 ms].

For carrier frequency range #2 (above 6 GHz), the periodicity of the SS is [5 ms, 10 ms, 20 ms, 40 ms, 80 ms, 100 ms].

Figure 6:
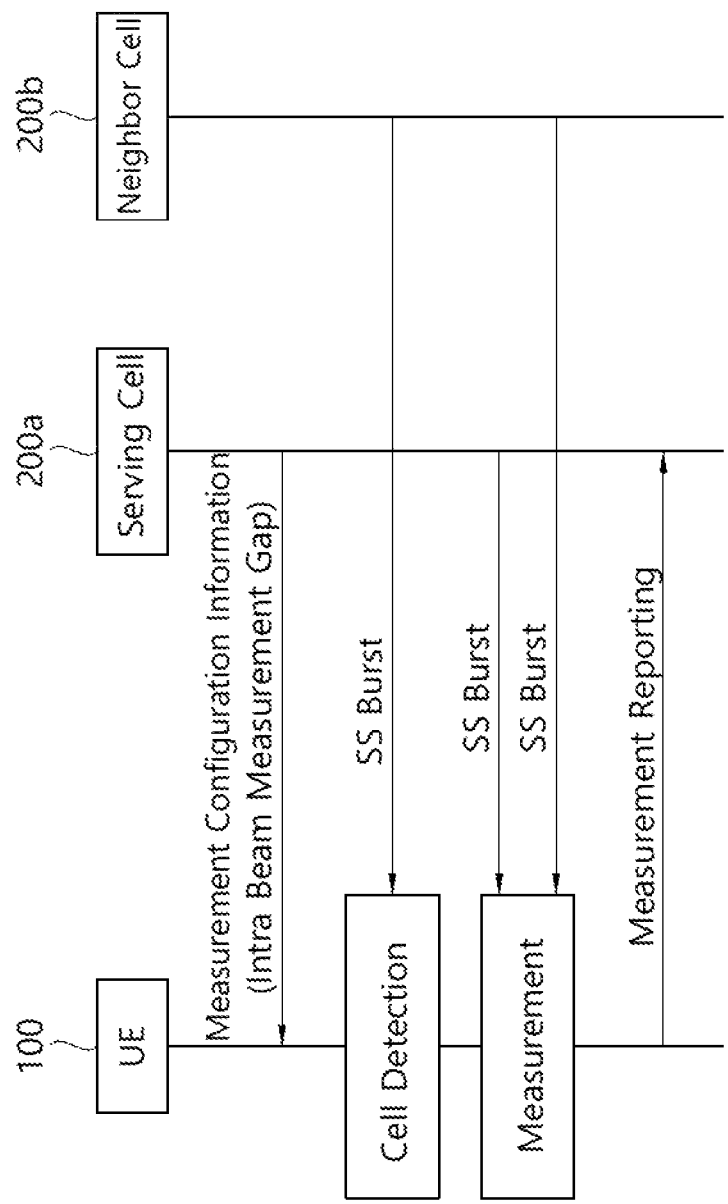
FIG. 6 shows a measurement and measurement reporting procedure considering an SS bust.

FIG. 6 is a flowchart briefly summarizing and showing a disclosure of the present specification.

As can be seen with reference to FIG. 6, a UE may receive measurement configuration information from a serving cell. The measurement configuration information may include information on a first measurement gap, e.g., an intra beam measurement gap. In addition, the measurement configuration information may include information on a second measurement gap, e.g., an intra RSRP measurement gap.

The UE may receive an SS burst from one or more neighbor cells to perform cell detection.

In addition, the UE may perform measurement based on the SS burst received from the one or more neighbor cells during a first measurement gap (e.g., an intra beam measurement gap) indicated by the information.

In addition, although not shown, the UE may perform RSRP measurement based on a reference signal (RS) from the one or more neighbor cells during the second measurement gap.

In addition, the UE may perform measurement reporting.

Figure 7:
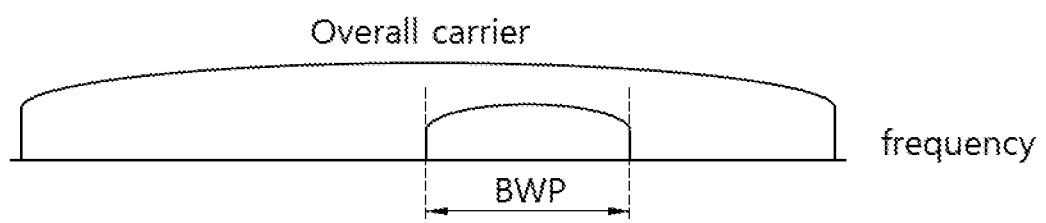
FIG. 7 shows an example of a BWP configured for a UE in NR.

FIG. 7 shows an example of a BWP configured for a UE in NR.

In NR, a wideband frequency of up to 400 MHz may be used. To enable efficient distribution and use of frequency resources for various UEs, a new concept of BWP is introduced in NR.

When UEs perform initial access and transmit information about UE capability to a base station, the base station may configure a BWP to be used by a UE for each UE based on the information. The base station may transmit information about the BWP configured for each UE. Then, transmission and reception of downlink and uplink data between each UE and the base station is performed only through the BWP configured for each UE. That is, the base station configures the BWP for the UE in order to instruct the UE not to use a frequency band other than the BWP in performing wireless communication with the base station.

FIG. 7 shows an example of a BWP configured for a UE in NR. In FIG. 7, an overall carrier indicates the entire carrier frequency available for the base station, and a BWP indicates a BWP configured by the base station for a UE.

The base station may configure the entire carrier frequency band of up to 400 MHz as a BWP for a UE. Alternatively, as shown in FIG. 7, the base station may configure only a partial band as a BWP for a UE. In addition, the base station may configure a plurality of BWPs for one UE. When a plurality of BWPs is configured for one UE, the frequency bands of the respective BWPs may or may not overlap each other.

<Disclosure of the Present Specification>

I. RSSI Measurement and RSRQ Measurement Based on BWP

Like an LTE UE, an NR UE may measure RSRP, RSRQ, reference signal-SINR (RS-SINR), or the like in order to be provided with mobility from a network. The UE may perform measurement based on a secondary synchronization signal (SSS) and measurement based on a channel state information reference signal (CSI-RS).

RSRQ and an RSSI in NR are defined as follows.

RSRQ

1) Secondary synchronization signal reference signal received quality (SS-RSRQ) is defined as the ratio N×(SS block RSRP)/(NR carrier RSSI), where N is the number of RBs of the NR carrier RSSI measurement bandwidth. The measurements in the numerator and denominator are made over the same set of resource blocks.

2) CSI reference signal received quality (CSI-RSRQ) is defined as the ratio (N×CSI-RSRP)/CSI-RSSI. Herein, N is the number of resource blocks in the CSI-RSSI measurement bandwidth. The measurements in the numerator and denominator are made over the same set of resource blocks.

RSSI

1) SS received signal strength indicator (SS-RSSI), includes the linear average of the total received power (in [W (Watt)]) observed in OFDM symbols of measurement time resource(s), in the measurement bandwidth, over N number of resource blocks from all sources, including co-channel serving and non-serving cells, adjacent channel interference, thermal noise etc. Measurement time resource(s) are confined within SMTC(SSB-based measurement timing configuration) window duration(s).

2) CSI received Signal Strength Indicator (CSI-RSSI), includes the linear average of the total received power (in [W]) observed only in OFDM symbols of measurement time resource(s), in the measurement bandwidth, over N number of resource blocks from all sources, including co-channel serving and non-serving cells, adjacent channel interference, thermal noise etc. Measurement time resource(s) for CSI-RSSI corresponds to OFDM symbols containing L3 (Layer 3) mobility CSI-RS.

As described above, in NR, a UE may perform two types of RSRP measurements and two types of RSSI measurements based on an SSS and a CSI-RS. The UE may perform SSS-based measurements and CSI-RS-based measurements according to the above definitions. In RSRP measurement and RSSI measurement based on an SSS, the SSS is transmitted in an SSB, and the frequency band of the SSB may be different from a BWP in which the UE actually operates. When the frequency band of the SSB is different from the BWP, the UE may perform inaccurate measurement and may thus not be provided with optimal mobility.

Specifically, in NR, a base station transmits an SSS through an SSB. For SSS-based measurement, the UE may perform RF retuning to a band in which the SSB exists and may then monitor the SSB received from the base station. Since the base station may configure a cell-defining SSB, the UE may perform RSRP measurement, RSSI measurement, and RS-SINR measurement based on the monitored SSB. The UE may perform RSRQ measurement based on the RSRP measurement and the RSSI measurement. Since the SSB may not be included in the BWP, the result of the RSRQ measurement may not properly reflect the characteristics of a channel environment in the BWP as a band in which the UE operates.

Hereinafter, specific examples in which a UE measures RSRQ when an SSB is included in a BWP and when an SSB is not included in a BWP will be described with reference to FIG. 8 to FIG. 10.

Figure 8:
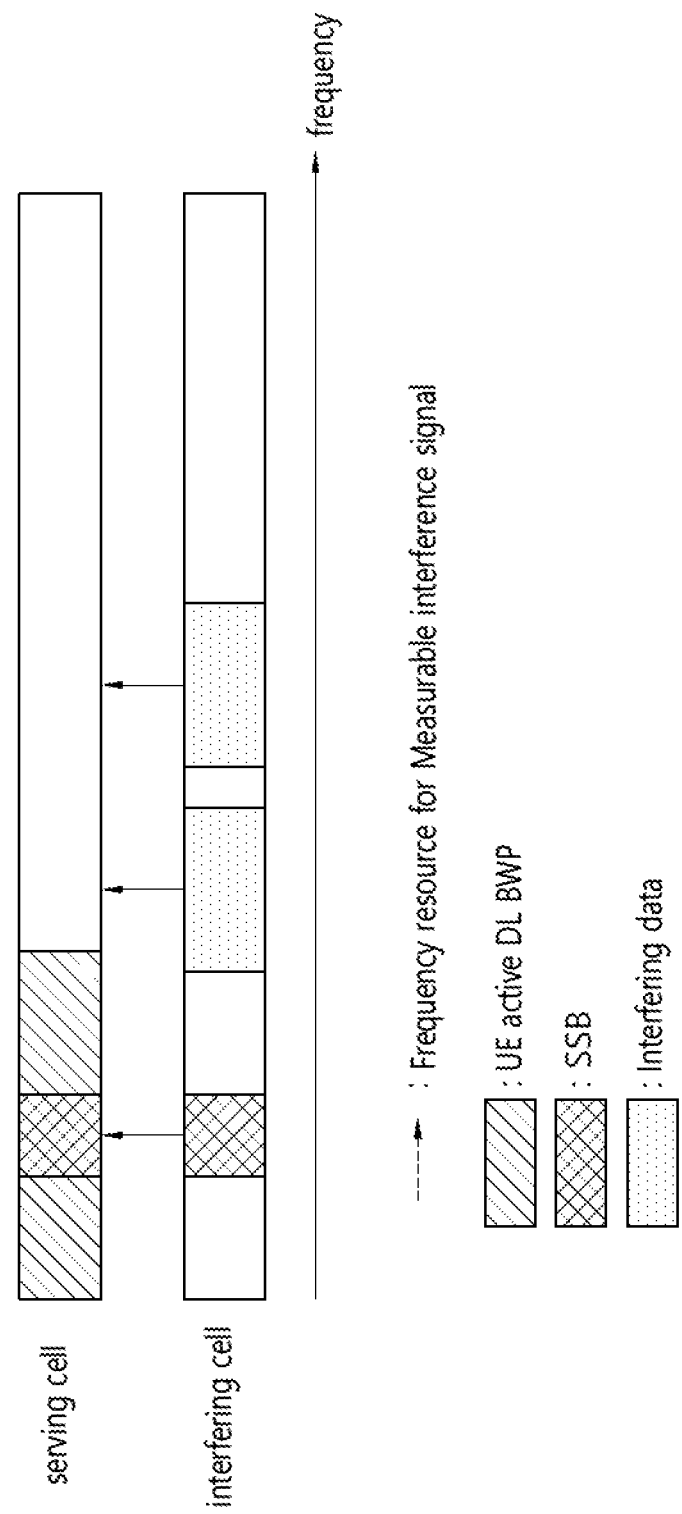
FIG. 8 shows an example in which a UE measures RSRQ when an SSB is included in a BWP.

FIG. 8 shows an example in which a UE measures RSRQ when an SSB is included in a BWP.

Referring to FIG. 8, a serving cell transmits an SSB within a UE active DL BWP. In this case, the UE may perform RSRP measurement and RSSI measurement based on the SSB received from the serving cell and may calculate RSRQ using the result of the RSRP measurement and the result of the RSSI measurement.

In FIG. 8, since RSSI measurement of a signal received from a neighbor interfering cell is performed in a BWP which is a band in which the UE operates, the calculated RSRQ properly reflects interference and channel characteristics of the BWP. Therefore, in FIG. 8, the UE may be provide with optimal mobility from a network even though performing the RSRP measurement and the RSSI measurement based on the SSB.

Figure 9:
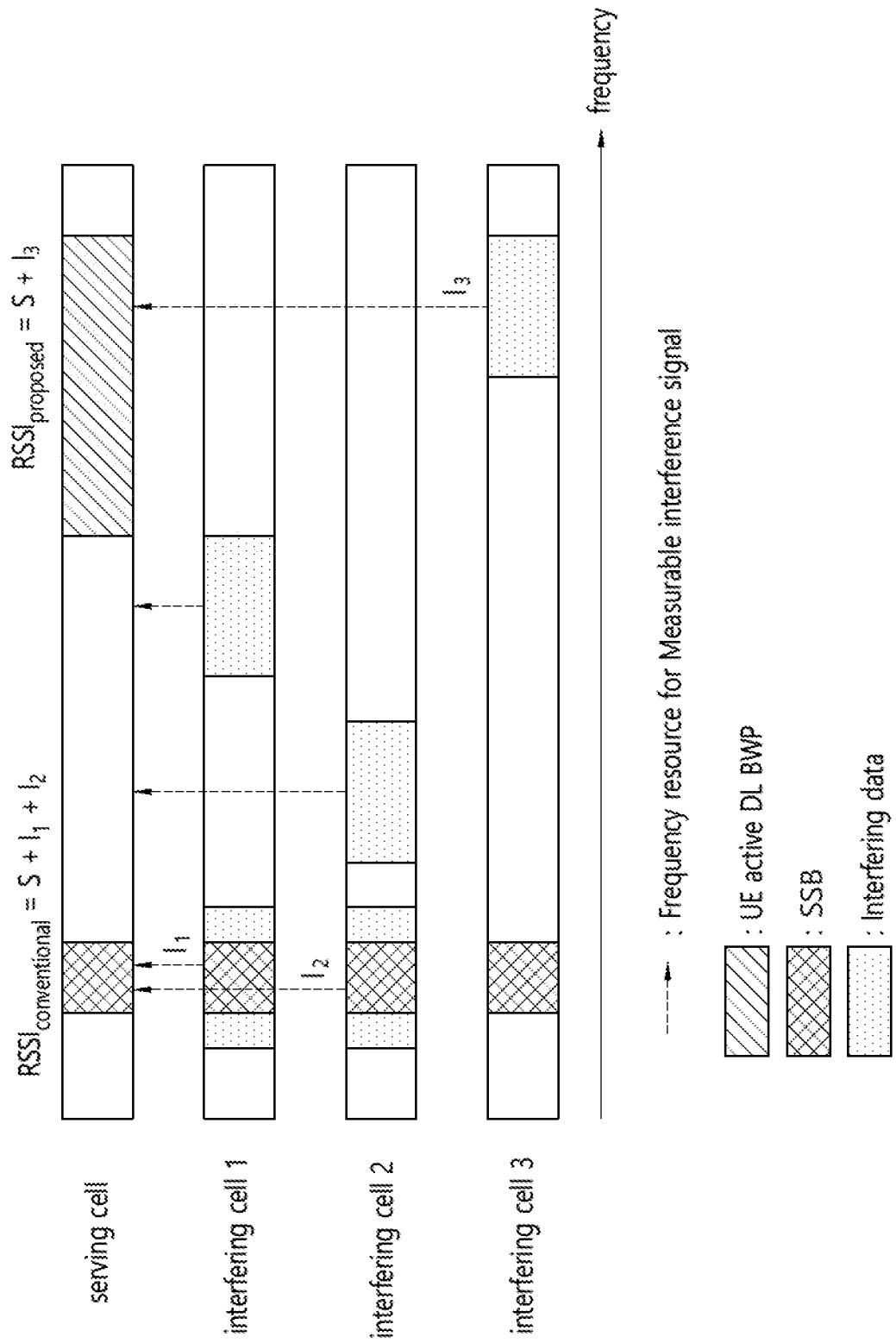
FIG. 9 shows a first example in which a UE measures RSRQ when an SSB is not included in a BWP.

FIG. 9 shows a first example in which a UE measures RSRQ when an SSB is not included in a BWP.

Referring to FIG. 9, a serving cell transmits an SSB in a frequency band not included in a BWP configured for a UE. The UE may receive interfering data transmitted from interfering cell 1 and interfering cell 2 in the same band as for the SSB and may receive interfering data transmitted from interfering cell 3 ($I_3$) in the same band as the BWP.

In this case, when the UE performs RSSI measurement based on the SSB as in a conventional method, the measurement result is $RSSI_{conventional}$=S (reception power from serving cell)+$I_1$ (interference by interfering data from interfering cell 1)+I2 (interference by interfering data by interfering cell 2).

Unlike in measured $RSSI_{conventional}$, the UE receives interference by interfering cell 3 in the BWP configured for the UE. If the UE actually measures RSSI in the BWP configured for the UE, the measurement result will be $S+I_3$.

That is, since $RSSI_{conventional}$ does not properly reflect interference and channel characteristics of the BWP in which the UE operates, when the UE reports RSRQ based on $RSSI_{conventional}$ to the serving cell, a problem may arise in mobility of the UE, for example, a handover may be performed when the handover is not required.

Figure 10:
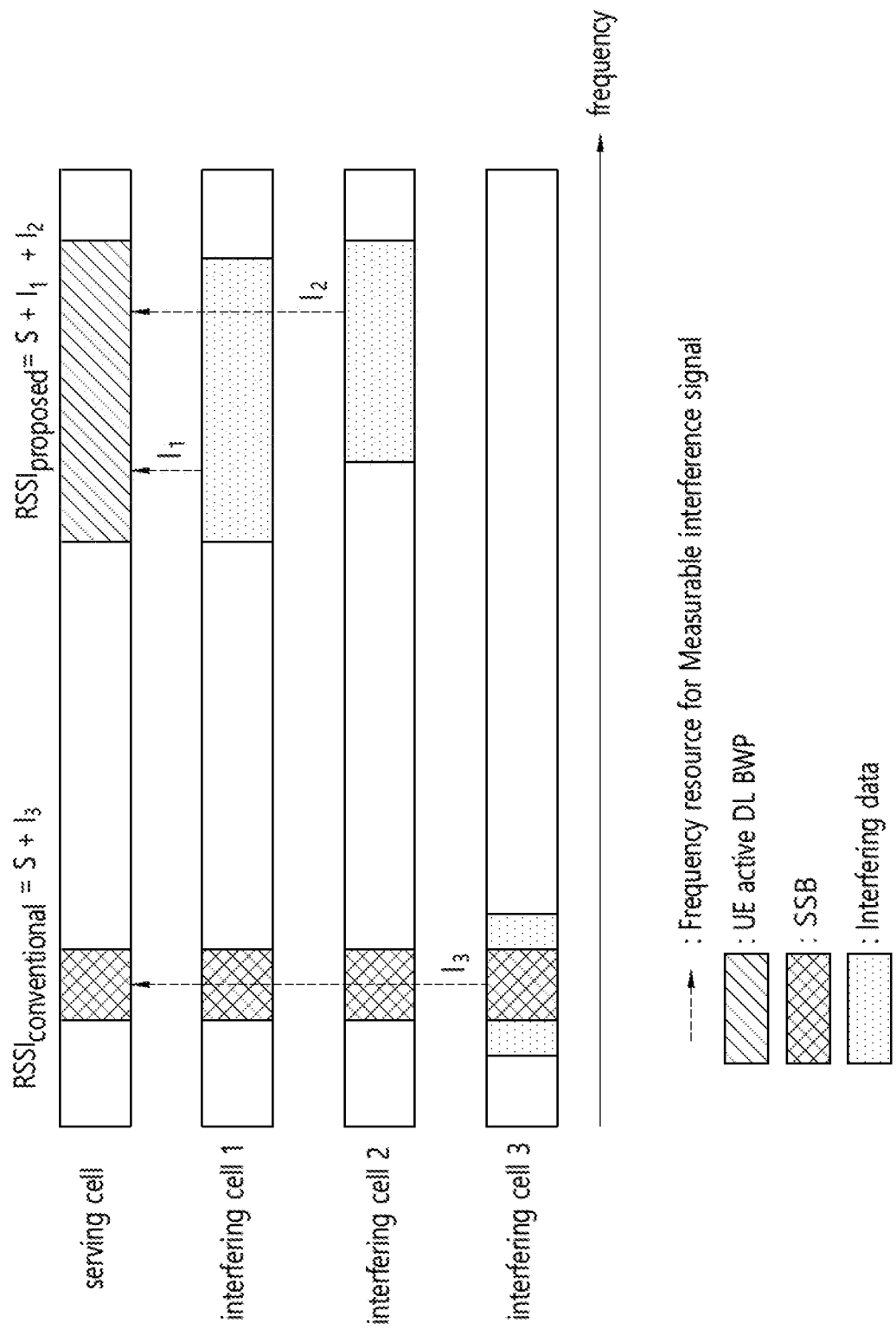
FIG. 10 shows a second example in which a UE measures RSRQ when an SSB is not included in a BWP.

FIG. 10 shows a second example in which a UE measures RSRQ when an SSB is not included in a BWP.

Referring to FIG. 10, a serving cell transmits an SSB in a frequency band not included in a BWP configured for a UE. The UE may receive interfering data transmitted from interfering cell 3 in the same band as for the SSB and may receive the interfering data transmitted from interfering cell 3 in the same band as the BWP.

In this case, when the UE performs RSSI measurement based on the SSB as in a conventional method, the measurement result is $RSSI_{conventional}$=$S+I_3$ (interference by interfering data from interfering cell 3).

Unlike in measured $RSSI_{conventional}$, the UE receives interference by interfering cell 1 and interfering cell 2 in the BWP configured for the UE. If the UE actually measures RSSI in the BWP configured for the UE, the measurement result will be $S+I_1+I_2$.

That is, since $RSSI_{conventional}$ does not properly reflect interference and channel characteristics of the BWP in which the UE operates, when the UE reports RSRQ based on $RSSI_{conventional}$ to the serving cell, a problem may arise in mobility of the UE, for example, a handover may not be performed when the handover is required.

To solve the problems mentioned in the examples of FIG. 9 and FIG. 10, the present specification proposes a method for performing RSSI measurement and RSRQ measurement based on a BWP when an SSB is not included in the BWP.

Specifically, in order to reflect band and channel characteristics in relation to interference in a BWP in which a UE operates, the UE and a base station may use RSSI and RSRQ respectively different from conventional RSSI and conventional RSRQ when an SSB is not included in the BWP.

In this case, to distinguish from the conventional RSSI and the conventional RSRQ, the used RSSI is referred to as Quasi-Co-Located-RSSI (QCLed-RSSI), and the used RSRQ is referred to as Quasi-Co-Located-RSRQ (QCLed-RSRQ).

Here, the QCLed-RSSI is RSSI that the UE measures using a reference signal received within the BWP. The QCLed-RSRQ is RSRQ determined based on the result of QCLed-RSSI measurement and the result of RSRP measurement. However, these terms are provided only to distinguish from the conventional RSSI and RSRQ, and the scope of one disclosure of the present specification is not limited by these terms.

Regarding RSRP measurement, the UE may perform RSRP measurement in the same manner as conventionally used. The UE may perform RSRP measurement based on an SSB received from a serving cell. Specifically, the UE may perform RSRP measurement using an SSS included in the SSB. The UE may use the result of RSRP measurement to determine conventional RSRQ or QCLed-RSRQ.

The UE may identify a frequency band in which the SSB is received through initial access to the serving cell. After the initial access, the UE may receive information about the BWP configured for the UE from the serving cell. The UE may compare the BWP and the SSB and may identify whether the frequency band of the SSB is included in the BWP. The UE may differently perform RSSI measurement and RSRQ measurement depending on whether the frequency band of the SSB is included in the BWP.

1) When the Frequency Band of the SSB is Included in the BWP

When the frequency band of the SSB is included in the BWP configured for the UE, the UE may perform RSSI measurement in the same manner as conventionally used. The UE may perform RSSI measurement based on the SSB received from the serving cell. Specifically, the UE may perform RSSI measurement using the SSS included in the SSB. The UE may determine RSRQ based on the result of the RSSI measurement and the result of the RSRP measurement. The UE may report the determine RSRQ to the serving cell.

2) When the Frequency Band of the SSB is not Included in the BWP

When the frequency band of the SSB is not included in the BWP configured for the UE, the UE may perform QCLed-RSSI measurement using a reference signal received within the BWP. Specifically, the UE may perform QCLed-RSSI measurement using the reference signal, such as a tracking reference signal (TRS) or a demodulation reference signal (DMRS) received within the BWP.

For reference, to determine RSRQ using the results of the RSRP measurement and the RSSI measurement performed in different bands, the UE may assume that the band for measuring RSRP and the band for measuring QCLed-RSSI have similar characteristics. That is, the UE may assume that a channel for transmitting the SSS and the band for measuring RSSI have a quasi-co-location (QCL) relationship. That is, the UE may assume that the two bands have a QCL relationship in space, average gain, and Doppler parameters.

For example, when the frequency band of the SSB is not included in the BWP configured for the UE, the UE may determine that the frequency band of the SSB and the BWP has a QCL relationship. Alternatively, the UE may receive an indication indicating that the SSB and the reference signal in the BWP have a QCL relationship from the serving cell. When receiving the indication, the UE may determine that the SSB and the reference signal in the BWP have a QCL relationship.

Accordingly, the UE may perform QCLed-RSSI measurement when the SSB and the reference signal in the BWP have a QCL relationship.

The UE may also perform QCLed-RSSI measurement in a partial band of the BWP. Specifically, the UE may receive information about a band for RSSI measurement included in the BWP from the serving cell. Here, the band for RSSI measurement may be a frequency band included in the BWP. The information about the band for RSSI measurement may include the number of RBs in which the UE measures RSSI. The UE may perform RSSI measurement in the band for RSSI measurement based on the received information. That it, the UE may perform RSSI measurement using a reference signal received in the band for RSSI measurement.

The UE may determine QCLed-RSRQ based on the result of the QCLed-RSSI measurement and the result of the RSRP measurement. The UE may report the determined QCLed-RSRQ to the serving cell.

Referring back to FIG. 9 and FIG. 10, an example of the result of QCLed-RSSI measurement is shown as $RSSI_{proposed}$. The result of QCLed-RSSI measurement is $S+I_3$ in FIG. 9, and the result of QCLed-RSSI measurement is $S+I_1+I_2$ in FIG. 10.

That is, when QCLed-RSSI measurement is performed according to the method proposed in the present specification, interference and channel characteristics of the BWP in which the UE actually operates may be reflected in the result of QCLed-RSSI measurement. When reporting QCLed-RSRQ determined based on the result of the QCLed-RSSI measurement to the serving cell, the UE may be provided with optimal mobility from the network.

Figure 11:
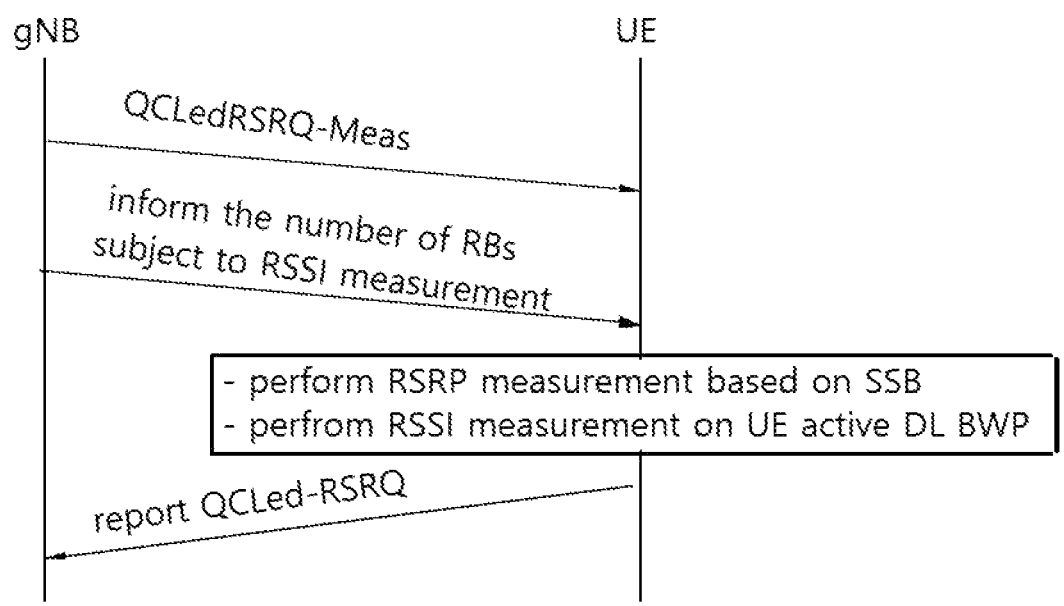
FIG. 11 is a flowchart schematically showing an RSRQ measurement procedure.

FIG. 11 is a flowchart schematically showing an RSRQ measurement procedure.

Referring to FIG. 11, when the frequency band of an SSB is not included in a BWP configured for a UE, the UE may receive a signal (QCLedRSRQ-Meas) indicating QCLed-RSRQ measurement from a serving cell (gNB).

The UE may receive a signal (Measure-Bandwidth) indicating the number of RBs subject to RSSI measurement from the serving cell. QCLedRSRQ-Meas and Measure-Bandwidth may be defined as illustrated in Table 1.

TABLE 1

```
-- ASN1START
MeasObjectNR ::=           SEQUENCE {
   QCLedRSRQ-Meas-rxx BOOLEAN OPTIONAL
   --Cond QCLed-
RSRQ
   Measure-Bandwidth-rxx ENUMERATED {n12, spare3, spare2,
      spare1}
}
```

After receiving the foregoing signals, the UE may perform RSRP measurement based on the SSB. The UE may perform RSSI measurement using a reference signal received in the BWP configured for the UE (UE active DL BWP). The UE may determine QCLed-RSRQ based on the result of the RSRP measurement and the result of the RSSI measurement. The UE may report the determined QCLed-RSRQ to the serving cell.

II. Definition of UE Capability According to Type of Receiving Antenna and Report of UE Capability In NR, a base station and a UE consider performing analog beamforming. Particularly, a receiving antenna of the UE may be configured in two types, which are an omnidirectional receiving antenna and an analog beamforming receiving antenna. The signal-power-to-interference-power ratio (SINR) of the UE in each call may vary depending on the type of the receiving antenna, and accordingly the cell detection performance of the UE may also vary. In NR, since the base station transmits a synchronization signal using analog beamforming, cell detection and beam detection of the UE may also vary depending on the type of the receiving antenna of the UE. However, the capability of a UE considering the type of a receiving antenna has not yet been defined, and a method for a base station to obtain information about the type of a receiving antenna of a UE also has not been proposed.

The present specification proposes a method for defining the capability of a UE in view of the type of a receiving antenna through a simulation and for reporting the capability of the UE according to the receiving antenna of the UE to a base station.

A UE may report information about an antenna-related capability to a serving cell. Here, the information about the antenna-related capability may include information about whether a receiving antenna supports analog beamforming.

Specifically, it is proposed to define the capability of the UE according to the type of the receiving antenna, that is, measurement capability, as illustrated in Table 2. In detail, referring to Table 2, the information about whether the receiving antenna supports analog beamforming may be included in ue-RxAnalogBeamFormingSupported. Further, ue-RxAnalogBeamFormingSupported may be included inphyLayerParameters.

TABLE 2

| UE-NR-Capability ::= | SEQUENCE { |
| --- | --- |
| accessStratumRelease | AccessStratumRelease, |
| ue-Category | INTEGER (1..5), |
| phyLayerParameters | PhyLayerParameters, |
| rf-Parameters | RF-Parameters, |
| measParameters | MeasParameters |
| ... | |
| } | |
| PhyLayerParameters ::= | SEQUENCE { |
| ue-RxAnalogBeamFormingSupported | BOOLEAN, |
| } | |

Hereinafter, the capability of a UE according to the type of a receiving antenna is specifically defined through simulation results illustrated in FIG. 12A to FIG. 14.

Figure 12A:
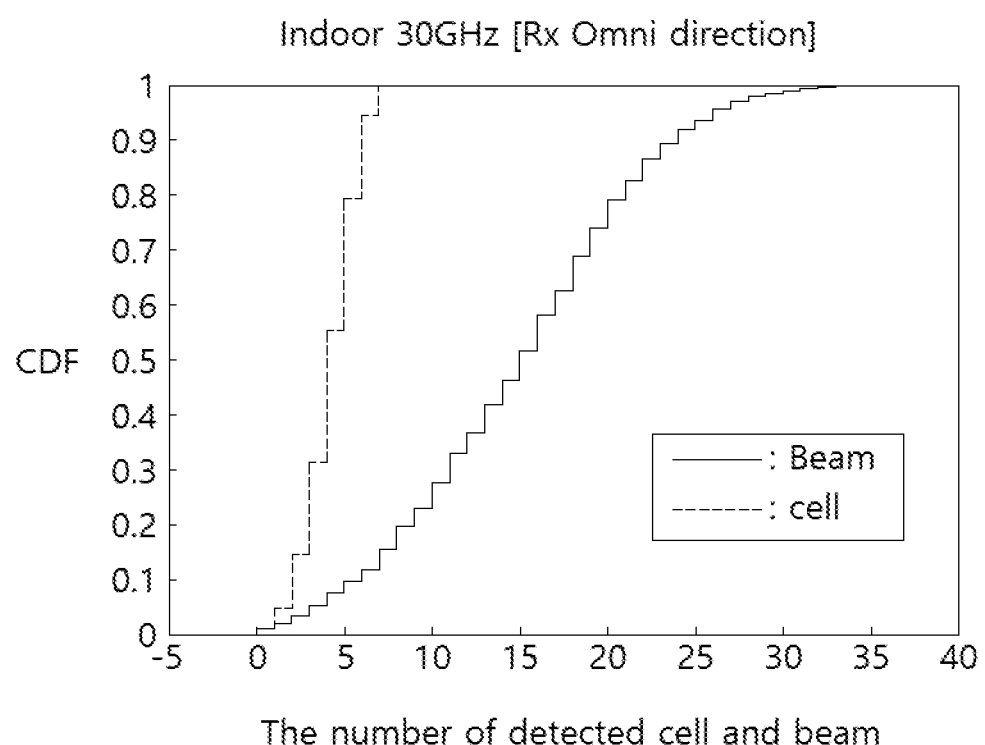
FIG. 12A shows the result of simulating a CDF of the number of cells and beams detected by a UE in 30 GHz when a receiving antenna is an omnidirectional antenna.
Figure 12B:
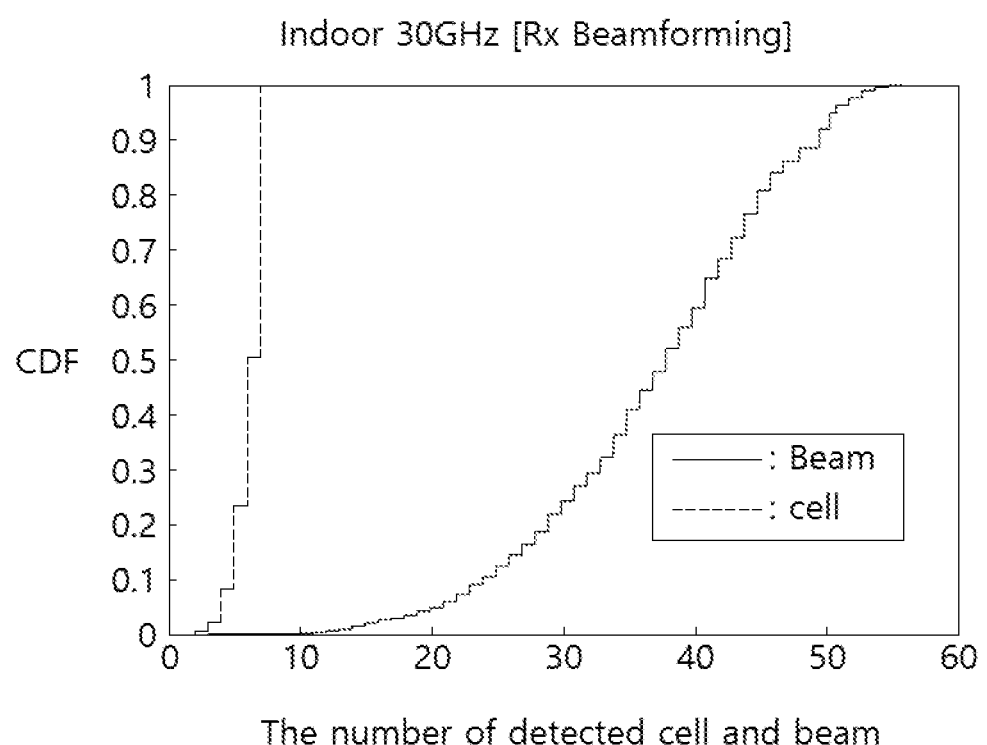
FIG. 12B shows the result of simulating a CDF of the number of cells and beams detected by a UE in 30 GHz when a receiving antenna is an analog beamforming antenna.

FIG. 12A shows the result of simulating a cumulative distribution function (CDF) of the number of cells and beams detected by a UE in 30 GHz when a receiving antenna is an omnidirectional antenna. FIG. 12B shows the result of simulating a CDF of the number of cells and beams detected by a UE in 30 GHz when a receiving antenna is an analog beamforming antenna.

The simulations in FIG. 12A and FIG. 12B are performed in an indoor hotspot environment. Referring to FIGS. 12A and 12B, CDFs of cells and beams detected in a carrier frequency of 30 GHz by the omnidirectional receiving antenna are different from those by the beamforming receiving antenna.

Figure 13A:
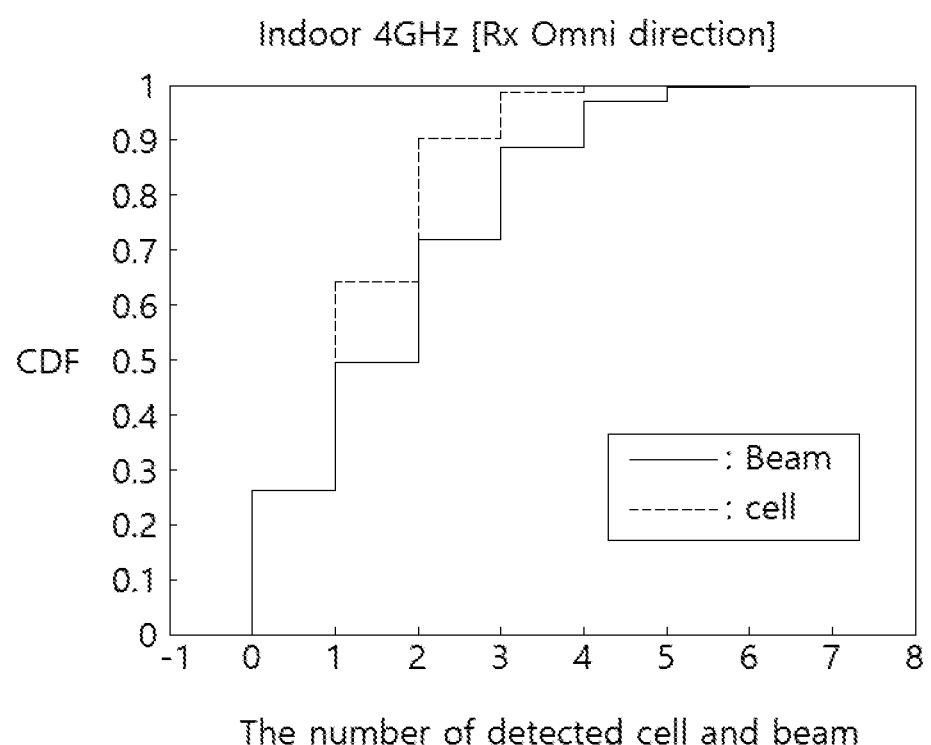
FIG. 13A shows the result of simulating a CDF of the number of cells and beams detected by a UE in 4 GHz when a receiving antenna is an omnidirectional antenna.
Figure 13B:
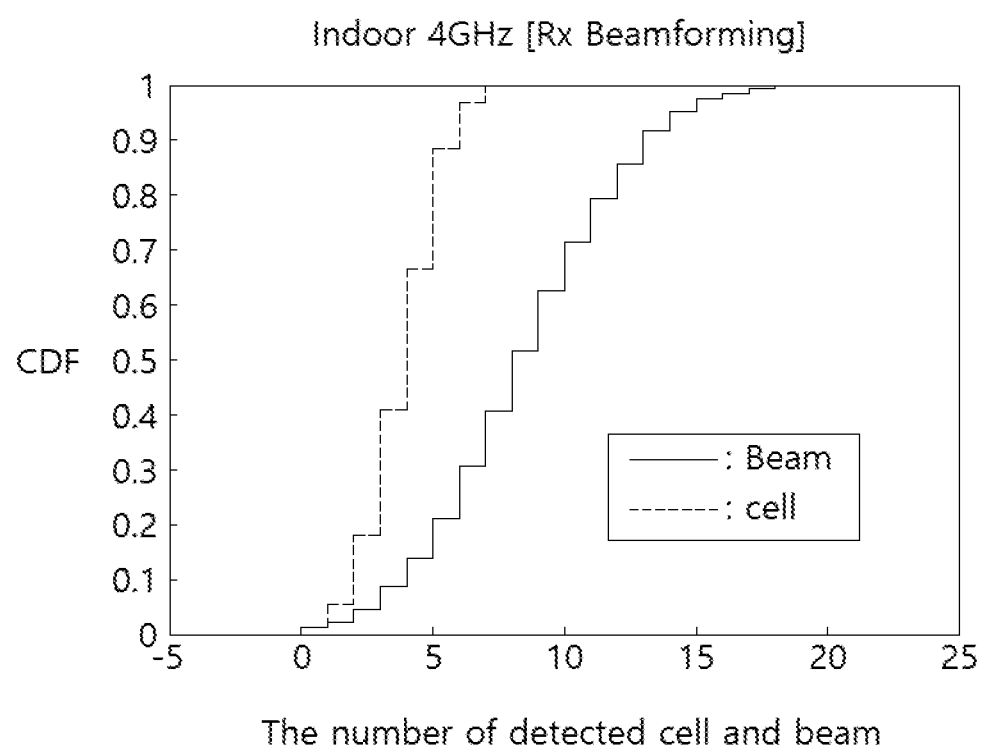
FIG. 13B shows the result of simulating a CDF of the number of cells and beams detected by a UE in 4 GHz when a receiving antenna is an analog beamforming antenna.

FIG. 13A shows the result of simulating a CDF of the number of cells and beams detected by a UE in 4 GHz when a receiving antenna is an omnidirectional antenna. FIG. 13B shows the result of simulating a CDF of the number of cells and beams detected by a UE in 4 GHz when a receiving antenna is an analog beamforming antenna.

The simulations in FIG. 13A and FIG. 13B are performed in an indoor hotspot environment. Referring to FIGS. 13A and 13B, CDFs of cells and beams detected in a carrier frequency of 4 GHz by the omnidirectional receiving antenna are different from those by the beamforming receiving antenna.

The number of neighbor cells detected on average by the UE according to a carrier frequency range and the type of a receiving antenna is illustrated in Table 3 based on the simulation results illustrated in FIG. 12A to FIG. 13B.

TABLE 3

| Scenario | | Indoor hotspot | |
| --- | --- | --- | --- |
| Carrier frequency range | | 4 GHz | 30 GHz |
| Omnidirectional receiving antenna | Number of cells detected on average | 1.21 | 4.2 |
| | Number of beams detected on average | 1.67 | 14.89 |
| Beamforming receiving antenna | Number of cells detected on average | 3.82 | 6.15 |
| | Number of beams detected on average | 8.44 | 36.99 |

Referring to Table 3, the UE detects a greater number of cells and beams in 30 GHz, which is above 6 GHz (frequency range 2), than in 4 GHz, which is sub-6 GHz (frequency range 1), because the number of beams transmitted by a base station in each frequency range is restricted in NR as illustrated below. The UE can detect a greater number of cells and beams in a high frequency range according to the following restriction. The maximum number (L) of SSBs in an SS burst set is illustrated below.

i) L=4 in a frequency range of less than 3 GHz
ii) L=8 in a frequency range from 3 GHz to less than 6 GHz
iii) L=64 in a frequency range of 6 GHz or more Further, referring to Table 3, the UE can detect a greater number of cells and beams when using an analog beamforming antenna than when using an omnidirectional receiving antenna.

FIG. 14 shows the result of simulating the numbers of cells and beams detected by a UE according to the number of beams transmitted by a base station and the type of a receiving antenna of the UE and the ratio between the number of cells and the number of beams.

FIG. 14 shows the numbers of cells and beams detected by a UE using an omnidirectional receiving antenna, the numbers of cells and beams detected by a UE using a beamforming receiving antenna, and the ratios between the numbers of cells and the numbers of beams where the number of beams transmitted by the base station is 3, 8, 16, 32, and 64. In FIG. 14, omni Rx represents an omnidirectional receiving antenna, and beamF Rx represents an analog beamforming antenna.

According to the simulation result in FIG. 14, as the number of beams transmitted by the base station increases, the numbers of cells and beams detected by the UE increase.

Based on the simulation results in FIG. 12A to FIG. 14, it is proposed to define the capability of a UE as follows according to the number of beams transmitted by a base station and the type of a receiving antenna of the UE. For reference, in NR, since there is no division between FDD and TDD and measurement for an inter-radio access technology (inter-RAT) is not necessary, the capability of a UE is defined only for an intra-frequency and an inter-frequency.

1) Capability of UE in Intra-Frequency Measurement
Frequency range 1: Carrier frequency of less than 6 GHz
i) UE supporting an omnidirectional receiving antenna: RSRP measurement, RSRQ measurement, and RS-SINR measurement may be performed for $X_{intra1\_omni}$ identified intra-frequency cells and $Y_{intra1\_omni}$ identified intra-frequencies per cell.
ii) UE supporting an analog beamforming receiving antenna: RSRP measurement, RSRQ measurement, and RS-SINR measurement may be performed for $X_{intra1\_beamf}$ identified intra-frequency cells and $Y_{intra1\_beamf}$ identified intra-frequencies per cell.

Frequency range 2: Carrier frequency of 6 GHz or higher i) UE supporting an omnidirectional receiving antenna: RSRP measurement, RSRQ measurement, and RS-SINR measurement may be performed for $X_{intra2\_omni}$ identified intra-frequency cells and $Y_{intra2\_omni}$ identified intra-frequencies per cell.

ii) UE supporting an analog beamforming receiving antenna: RSRP measurement, RSRQ measurement, and RS-SINR measurement may be performed for $X_{intra2\_beamf}$ identified intra-frequency cells and $Y_{intra2\_beamf}$ identified intra-frequencies per cell.

2) Capability of UE in NR Inter-Frequency Measurement

Frequency range 1: Carrier frequency of less than 6 GHz i) UE supporting an omnidirectional receiving antenna: RSRP measurement, RSRQ measurement, and RS-SINR measurement may be performed for $X_{inter1\_omni}$ identified inter-frequency cells and $Y_{inter1\_omni}$ identified inter-frequencies per cell.

ii) UE supporting an analog beamforming receiving antenna: RSRP measurement, RSRQ measurement, and RS-SINR measurement may be performed for $X_{inter1\_beamf}$ identified inter-frequency cells and $Y_{inter1\_beamf}$ identified inter-frequencies per cell.

Frequency range 2: Carrier frequency of 6 GHz or higher i) UE supporting an omnidirectional receiving antenna: RSRP measurement, RSRQ measurement, and RS-SINR measurement may be performed for $X_{inter2\_omni}$ identified inter-frequency cells and $Y_{inter2\_omni}$ identified inter-frequencies per cell.

ii) UE supporting an analog beamforming receiving antenna: RSRP measurement, RSRQ measurement, and RS-SINR measurement may be performed for $X_{inter2\_beamf}$ identified inter-frequency cells and $Y_{inter2\_beamf}$ identified inter-frequencies per cell.

Based on the simulation results in FIG. 12A to FIG. 14, the capabilities of the UE in 1) and 2) may be configured as illustrated below.

Figure 15:
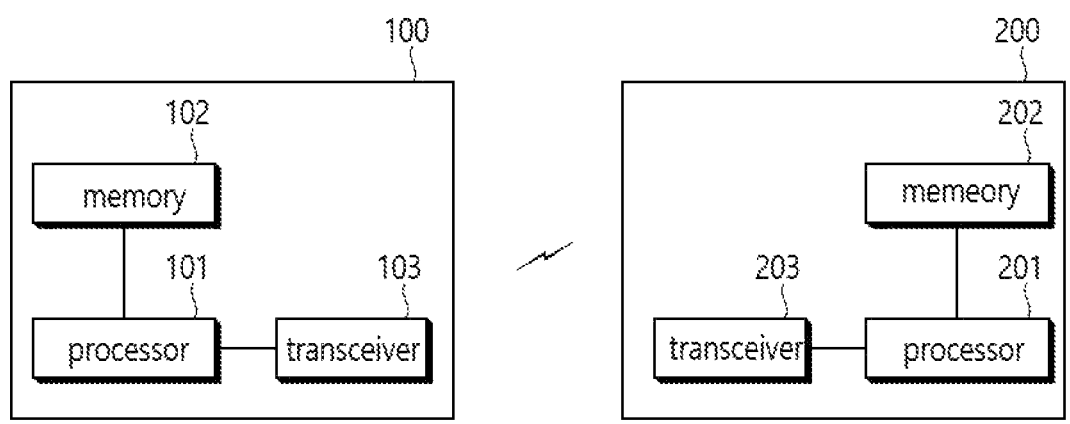
FIG. 15 is a block diagram showing a wireless communication system for implementing a disclosure of the present specification.

$X_{intra1\_omni}=2$, $Y_{intra1\_omni}=1$, $X_{intra1\_beamf}=4$, $Y_{intra1\_beamf}=2$, $X_{intra2\_omni}=4$, $Y_{intra2\_omni}=4$, $X_{intra2\_beamf}=6$, $Y_{intra2\_beamf}=6$ $X_{inter1\_omni}=2$, $Y_{inter1\_omni}=1$, $X_{inter1\_beamf}=2$, $Y_{inter1\_beamf}=2$, $X_{inter2\_omni}=2$, $Y_{inter2\_omni}=2$, $X_{inter2\_beamf}=3$, $Y_{inter2\_beamf}=3$ FIG. 15 is a block diagram showing a wireless communication system for implementing a disclosure of the present specification.

A BS 200 includes a processor 201, a memory 202, and a transceiver 203. The memory 202 is coupled to the processor 201, and stores a variety of information for driving the processor 201. The transceiver 203 is coupled to the processor 201, and transmits and/or receives a radio signal. The processor 201 implements the proposed functions, procedures, and/or methods. In the aforementioned embodiment, an operation of the BS may be implemented by the processor 201.

A UE 100 includes a processor 101, a memory 102, and a transceiver 103. The memory 102 is coupled to the processor 101, and stores a variety of information for driving the processor 101. The transceiver 103 is coupled to the processor 101, and transmits and/or receives a radio signal. The processor 101 implements the proposed functions, procedures, and/or methods.

The processor may include Application-specific Integrated Circuits (ASICs), other chipsets, logic circuits, and/or data processors. The memory may include Read-Only Memory (ROM), Random Access Memory (RAM), flash memory, memory cards, storage media and/or other storage devices. The transceiver may include a baseband circuit for processing a radio signal. When the above-described embodiment is implemented in software, the above-described scheme may be implemented using a module (process or function) which performs the above function. The module may be stored in the memory and executed by the processor. The memory may be disposed to the processor internally or externally and connected to the processor using a variety of well-known means.

In the above exemplary systems, although the methods have been described based on the flowcharts using a series of the steps or blocks, the present disclosure is not limited to the sequence of the steps, and some of the steps may be performed at different sequences from the remaining steps or may be performed simultaneously with the remaining steps. Furthermore, those skilled in the art will understand that the steps shown in the flowcharts are not exclusive and may include other steps or one or more steps of the flowcharts may be deleted without affecting the scope of the present disclosure.

What is claimed is:

1. A method performed by a user equipment (UE) operating in a wireless communication system, the method comprising:

receiving measurement configuration information from a serving cell;

performing reference signal received power (RSRP) measurement based on a synchronization signal block (SSB) received from the serving cell based on the measurement configuration information;

performing received signal strength indicator (RSSI) measurement based on the measurement configuration information;

determining a reference signal received quality (RSRQ) based on the performed RSRP measurement and the performed RSSI measurement; and transmitting a measurement report message including the RSRQ to the serving cell, wherein the RSSI measurement is performed based on a reference signal received in a bandwidth part (BWP) configured for the UE, based on that a frequency band of the SSB is not included in the BWP, and wherein the RSSI measurement based on the reference signal received in the BWP is performed, based on that the SSB and the reference signal in the BWP have a quasi-co-location (QCL) relationship.

2. The method of claim 1, further comprising:

receiving information for a band for RSSI measurement included in the BWP from the serving cell, wherein the band for RSSI measurement is a frequency band included in the BWP.

3. The method of claim 2, wherein the performing of the RSSI measurement is performing RSSI measurement based on a reference signal received in the band for RSSI measurement.

4. The method of claim 1, further comprising:

receiving an information for that the SSB and the reference signal in the BWP have the QCL relationship.

5. The method of claim 1, further comprising:

reporting information for an antenna-related capability to the serving cell.

6. The method of claim 5, wherein the information for the antenna-related capability includes information for whether a receiving antenna supports analog beamforming.

7. A user equipment (UE) configured to operate in a wireless communication system, the UE comprising:
a transceiver; and
a processor configured to control the transceiver, the processor further configured to:
receive measurement configuration information from a serving cell;
perform reference signal received power (RSRP) measurement based on a synchronization signal block (SSB), which is received from the serving cell based on the measurement configuration information;
perform received signal strength indicator (RSSI) measurement based on the measurement configuration information;
determine a reference signal received quality (RSRQ) based on the performed RSRP measurement and the performed RSSI measurement; and
transmit a measurement report message including the RSRQ to the serving cell,
wherein the RSSI measurement is performed based on a reference signal received in a bandwidth part (BWP) configured for the UE, based on that a frequency band of the SSB is not included in the BWP, and
wherein the RSSI measurement based on the reference signal received in the BWP is performed, based on that the SSB and the reference signal in the BWP have a quasi-co-location (QCL) relationship.

8. The UE of claim 7,
wherein the processor is further configured to:
control the transceiver to receive information for a band for RSSI measurement included in the BWP from the serving cell; and
perform RSSI measurement based on a reference signal received in the band for RSSI measurement, and
wherein the band for RSSI measurement is a frequency band included in the BWP.

9. The UE of claim 7, wherein the processor is further configured to:
control the transceiver to report information for an antenna-related capability to the serving cell.

10. The UE of claim 9, wherein the information for the antenna-related capability includes information for whether a receiving antenna supports analog beamforming.

11. The UE of claim 7, wherein the UE communicates with at least one of a mobile terminal, a network, or an autonomous vehicle other than the UE.

12. The UE of claim 7, wherein the processor is further configured to:
receive an information for that the SSB and the reference signal in the BWP have the QCL relationship.

* * * * *